United States Patent
Winnemoeller et al.

(10) Patent No.: US 8,614,708 B2
(45) Date of Patent: Dec. 24, 2013

(54) SYSTEM AND METHOD FOR SCALABLE RENDERING OF DIFFUSION CURVES

(75) Inventors: Holger Winnemoeller, Seattle, WA (US); Alexandrina Orzan, Grenoble (FR)

(73) Assignee: Adobe Systems Incorporated, San Jose, CA (US)

(*) Notice: Subject to any disclaimer, the term of this patent is extended or adjusted under 35 U.S.C. 154(b) by 502 days.

(21) Appl. No.: 12/621,254

(22) Filed: Nov. 18, 2009

(65) Prior Publication Data

US 2013/0127856 A1    May 23, 2013

Related U.S. Application Data

(60) Provisional application No. 61/116,985, filed on Nov. 21, 2008.

(51) Int. Cl.
*G06T 15/30* (2011.01)
*G06T 17/20* (2006.01)

(52) U.S. Cl.
USPC ......................................................... 345/423

(58) Field of Classification Search
None
See application file for complete search history.

(56) References Cited

U.S. PATENT DOCUMENTS

| | | | |
|---|---|---|---|
| 6,016,153 A * | 1/2000 | Gueziec et al. | 345/441 |
| 7,239,313 B2 | 7/2007 | Liepa | |
| 8,334,868 B2 | 12/2012 | Carr et al. | |
| 8,379,018 B2 | 2/2013 | Carr et al. | |
| 2005/0237341 A1* | 10/2005 | Gangnet et al. | 345/606 |
| 2006/0028466 A1* | 2/2006 | Zhou et al. | 345/420 |
| 2006/0277472 A1* | 12/2006 | Yodo et al. | 715/738 |
| 2007/0242067 A1* | 10/2007 | Sharma et al. | 345/423 |
| 2009/0231337 A1 | 9/2009 | Carr | |
| 2009/0231338 A1 | 9/2009 | Carr | |
| 2009/0248184 A1 | 10/2009 | Steingart et al. | |

OTHER PUBLICATIONS

Demaret et al (Image Compression by Linear Splines over Adaptive Triangulation, 2006).*
Cirak et al (Subdivision Surfaces: A New Paradigm for Thin-Shell Finite-Element Analysis, 2000).*
PDF Reference third edition (Adobe Portable Document Format, version 1.4, 2001, Chapter 4).*
U.S. Appl. No. 61/197,250, filed Oct. 24, 2008.
U.S. Appl. No. 12/570,632, filed Sep. 30, 2009.
Orzan, et al. Diffusion Curves: A Vector Representation for Smooth-Shaded Images, ACM Transactions on Graphics (Proceedings of SIGGRAPH 2008), vol. 27—2008.

(Continued)

*Primary Examiner* — Ke Xiao
*Assistant Examiner* — Kyle Zhai
(74) *Attorney, Agent, or Firm* — Wolfe-SBMC

(57) ABSTRACT

The systems and methods described herein may allow diffusion curve images to be displayed by a variety of applications without requiring specialized graphics hardware to render the images. The system may provide mechanisms to convert a diffusion curve representation to an alternate representation in a scalable, portable format. The conversion may include a tessellation operation, and may produce a mesh of shapes (e.g., triangles) for which diffusible attribute values (e.g. color and blur) are assigned to each node. Tessellating an image may include generating a piecewise linear approximation of the diffusion curves and triangulating the image to generate the mesh. Color values for each channel may be assigned by solving a sparse linear system in the triangle domain. The alternate representation may be displayed by another application using various interpolation techniques. The alternate representation may be resolution-independent and compact, as compared to other representations used to display diffusion curve images.

20 Claims, 14 Drawing Sheets

(56) References Cited

OTHER PUBLICATIONS

Joshi P., Carr N.: Repoussé: Automatic inflation of 2D artwork. In SBIM'08 (2008), pp. 49-55.
Rendering Surface Details with Diffusion Curves, Stefan Jeschke, David Cline, Peter Wonka, ACM Transactions on Graphics. 2009. To be presented at SIGGRAPH ASIA Dec. 2009.
Carlsson, S. 1988. Sketch based coding of grey level images. Signal Processing 15, 1, 57-83.
A GPU Laplacian Solver for Diffusion Curves and Poisson Image Editing, Stefan Jeschke, David Cline, Peter Wonka, ACM Transactions on Graphics. 2009. to be presented at SIGGRAPH Asia Dec. 2009.
Nealen A., Sorkine O., Alexa M., Cohenor D.: A sketch-based interface for detail-preserving mesh editing. ACM Trans. Graph. 24, 3 (2005), 1142-1147.
Lecot, G., and Levy, B. 2006. Ardeco: Automatic Region DEtection and COnversion. In Eurographics Symposium on Rendering conf. proc.
Orzan, A., Bousseau, A., Barla, P., and Thollot, J. 2007. Structure-preserving manipulation of photographs. In 5th International Symposium on Non-Photorealistic Animation and Rendering (NPAR),103-110.
Pérez, P., Gangnet, M., and Blake, A. 2003. Poisson image editing. In ACM TOG (Proceedings of SIGGRAPH 2003), vol. 22, 313-318.
Price, B., and Barrett, W. 2006. Object-based vectorization for interactive image editing. In Visual Computer (Proceedings of Pacific Graphics '06), vol. 22, 661-670.
Sun, J., Liang, L., Wen, F., and Shum, H.-Y. 2007. Image vectorization using optimized gradient meshes. In ACM TOG (Proceedings of SIGGRAPH 2007), vol. 26, 11.
Nealen, Andrew et al., "Fibermesh: Designing Freeform Surfaces with 3D Curves", *ACM Transactions Graphics 26*, 3, 41, (2007), 8 pages.
Owada, et al., "A Sketching Interface for Modeling the Internal Structures of 3D Shapes", International Conference on Computer Graphics and Interactive Techniques, *ACM SIGGRAPH 2007.*, (2007), 9 pages.
Pinkall, Ulrich et al., "Computing Discrete Minimal Surfaces and Their Conjugates", *Experimental Mathematics*, 2, (Feb. 1993), 33 pages.
Prasad, et al., "Fast and Controllable 3D Modelling from Silhouettes", *Eurographics, Short Papers* (Sep. 2005), pp. 9-12., (Sep. 2005), 4 Pages.
Schmidt, et al., "ShapeShop: Sketch-Based Solid Modeling with BlobTrees", Schmidt R., Wyvill B., Sousa M., Jorge J.: "Shapeshop: Sketch-based Solid Modeling with Blobtrees", 2005., (2005), 10 pages.
Schneider, et al., "Geometric Fairing of Irregular Meshes for Free-Form Surface Design", *Computer Aided Geometric Design 18*, 4 (2001 ), 359-379., (2001), 25 pages.
Shewchuk, Jonathan R., "Triangle: Engineering a 2D Quality Mesh Generator and Delaunay Triangulator", *Applied Computational Geometry: Towards Geometric Engineering, Lin M. C., Manocha D.*, (Eds.), val. 1148 of Lecture Notes in Computer Science. Springer-Verlag, May 1996, pp. 203-222. From the First ACM Workshop on Applied Computational Geometry., (May 1996), 10 pages.
Sourin, Alexei "Functionally Based Virutal Computer Art", *I3D '01: Proceedings of the 2001 symposium on Interactive 3D graphics* (New York, NY, USA, 2001 ), ACM, pp. 77-84., (2001), 9 pages.
Zeleznik, et al., "SKETCH: An Interface for Sketching 3D Scenes", *SIGGRAPH 96 Conference Proceedings* (1996), Rushmeier H., (Ed.), Addison Wesley, pp. 163-170., (1996), 6 pages.
"Non-Final Office Action", U.S. Appl. No. 12/276,105, (May 4, 2012), 17 pages.
"Non-Final Office Action", U.S. Appl. No. 12/276,106, (Jun. 4, 2012), 22 pages.
"Non-Final Office Action", U.S. Appl. No. 12/766,479, (Jan. 3, 2013), 8 pages.
"Non-Final Office Action", U.S. Appl. No. 12/766,489, (Dec. 6, 2012), 8 pages.
"Notice of Allowance", U.S. Appl. No. 12/276,105, (Aug. 15, 2012), 5 pages.
"Notice of Allowance", U.S. Appl. No. 12/276,106, (Oct. 12, 2012), 6 pages.
Botsch, et al., "An Intuitive Framework for Real-Time Freeform Modeling" *ACM Trans. Graph. 23*, 3 (2004), 630-634., (2004), 5 pages.
Botsch, et al., "Efficient Linear System Solvers for Mesh Processing", *Mathematics of Surfaces XI*. 2005, pp. 62-83., (2005), 22 pages.
Desbrun, Mathieu et al., "Discrete Differential-Geometry Operators in nD", *Caltech, USC*, (Jul. 22, 2000), 26 pages.
Igarashi, Takeo et al., "Teddy: A Sketching Interface for 3D Freeform Design", *In SIGGRAPH '99*, Los Anseles, CA, USA, (1999), pp. 409-416.
Karpenko, Olga A., et al., "Smoothsketch: 3D Free-Form Shapes from Complex Sketches", *ACM Transactions on Graphics 25/3*, (2006), pp. 589-598.
Levinski, et al., "Interactive function-based shape modelling", *Computers & Graphics 31*, 1 (2007), 66-76., (2007), 11 pages.
Liu, et al., "Sketch-based free-form shape modelling with a fast and stable numerical engine", *Computers & Graphics 29* , 5 (2005), 771-786., (2005), 16 pages.
Meyer, et al., "Discrete Differential-Geometry Operators for Triangulated 2-Manifolds", *Proceedings of Visualization and Mathematics*, Jul. 22, 2002, 26 pages.

* cited by examiner

SYSTEM AND METHOD FOR SCALABLE RENDERING OF DIFFUSION CURVES

PRIORITY INFORMATION

This application claims benefit of priority of U.S. Provisional Application Ser. No. 61/116,985 entitled "System and Method for Adding Vector Texture to Vector Graphics Images" filed Nov. 21, 2008, the content of which is incorporated by reference herein in its entirety.

BACKGROUND

Description of the Related Art

Until recently, vector graphics typically only encompassed linear or radial gradients, limiting the diversity of images that could be faithfully represented in a vector format. Therefore, standard vector art (e.g., found in signage or logo design) looks very flat, although it may include slight color variations for limited shading effects. Linear or radial variation may work well with simple shapes, but may not provide sufficient color variation for representing complex shading, color gradients, or textures.

Gradient meshes can provide the ability to create arbitrarily complex gradients in images with good results, but workflows for creation and manipulation of gradient meshes typically require editing that is less efficient than it should be (e.g., a lot of manual editing). Gradient meshes define the outline of a shape and comprise a grid structure in the interior. Therefore, many edits are imposed by the arbitrary grid-mesh that the gradient mesh employs, and have little to do with the actual or intended image content. With gradient meshes, a color can be assigned to each point in the grid. This can be a very tedious process, since the color must be defined and assigned for each point, even if it is the same the color as its neighbors. Modifying colors with gradients meshes is also time-consuming, because if a color is modified, all of the points having that color will need to be modified.

Diffusion curves are a vector representation that simplifies the creation and editing of smooth gradients and blur, allowing the creation and capture of complex gradients within vector graphics images in a variety of styles. In order to render and display a diffusion curve image using raster graphics (i.e. using an approach in which a vector image is rasterized for output on a raster output device, such as a CRT or LDC monitor), diffusion operations are typically performed in a bit-mapped space. Such a raster graphics approach (where the bitmap is essentially the display screen) may involve the use of shader programs. While the operations included in these programs can in some cases be implemented by standard instructions executed on a CPU, they can be performed much more efficiently when implemented by specialized graphics instructions executed using specialized graphics hardware (e.g., a graphics processor). For example, to allow interactive viewing (zooming, panning, etc.) and editing, it is important that the user can display changes of the image or image view quickly, which may not be feasible without a GPU and a corresponding programming interface. While many modern computer systems are equipped with adequate GPU processors, some legacy systems may not be. Additionally, the GPU capabilities of many mobile devices (e.g., PDA, smartphones, etc.) are not sufficient to efficiently render diffusion curve images using raster-based diffusion. Therefore, current diffusion curve representations are not very scalable or portable.

SUMMARY

Various embodiments of a system and method for scalable rendering of diffusion curve images are described. Diffusion curves are a vector representation that simplifies the creation and editing of smooth gradients and blur, allowing the creation and capture of complex gradients within vector graphics images in a variety of styles. The system and methods described herein may allow images created using diffusion curves to be displayed and/or otherwise manipulated within a variety of applications (e.g., document creation and display, animation, etc.) without requiring the use of specialized graphics hardware (e.g., special-purpose graphics processors) to render the images.

The system described herein may provide mechanisms to create diffusion curve images using sketching type tools and to convert the resulting data representation to an alternate representation in a scalable, portable format usable in a variety of other applications. The methods described herein to generate the alternate representation may in some embodiments include a tessellation operation and an attribute assignment operation, and may produce a mesh of shapes for which values of diffusible attributes (e.g. color and blur) are assigned to each node. The alternate representation may in some embodiments be displayed by another application (i.e. an application other than the image editing application used to created the diffusion curve image) using standard interpolation techniques. The alternate representation may be resolution-independent and may be more compact than the bit-mapped or other raster graphics representations typically used in displaying diffusion curve images.

In various embodiments, the methods describe herein may be implemented as or in a tool, module, plug-in, stand-alone application, etc. For simplicity, implementations of embodiments of the diffusion curve conversion method described herein may be referred to collectively as a diffusion curve conversion tool. Various embodiments of the system and methods described herein may be applied in one or more of, but not limited to, enhancing photographs or other images using diffusion curves, creating 2D vector images, creating 2D animations, importing 2D vector images and/or animations into documents or other files, and rendering 2D vector images in systems that do not include specialized graphics hardware (e.g., GPUs). In some embodiments, various parameters of the methods and tools described herein may be specified by the user (e.g., through a graphical user interface).

In some embodiments, a method for scalable rendering of diffusion curve images may include accessing data representing an input vector image (or a portion of such an image) bounded by a closed two-dimensional boundary (e.g., by one or more diffusion curves), tessellating the input image to generate an alternate data representation of the input image comprising a mesh of tessellation elements (e.g., triangle), assigning color constraint values to each vertex of the mesh of tessellation elements in the alternate data representation, and storing the alternate data representation (including the assigned color constraint values) in a scalable, portable format for subsequent use (e.g., for subsequent display). The method may include rendering an output image from the stored alternate data representation, which may include interpolating the assigned color constraint values to determine color values to be displayed at image locations corresponding to the interior of the tessellation elements (triangles), thereby producing a diffused color effect across the output image.

In some embodiments, data representing a diffusion curve making up the boundary of the image may include one or more color constraint values that are specified at control points along the curve, and the method may include assigning a color constraint value to a vertex of the mesh corresponding to one of the color control points along the curve dependent on the color constraint values specified at the control point. In some embodiments, tessellating the input image may include generating a piecewise linear approximation of the diffusion curve(s) of the input image and triangulating the input image. In some embodiments, tessellating the image may include generating a respective data representation of the input image (i.e. a respective mesh of tessellation elements, such as triangles) for each of a plurality of color channels. The tessellation operation may also include generating one or more ghost vertices to complete one-ring neighborhoods of vertices on the boundary of the tessellated image. In some embodiments the color constraint values may be assigned by solving a sparse linear system in the triangle domain.

In embodiments in which blur values are included in the diffusion curve representation, the method may include assigning a blur value to at least some of the vertices of the mesh. In such embodiments, rendering the image may include interpolating the blur value(s) to control the smoothness of the diffused color effect in the output image.

In various embodiments, the methods described herein may be implemented by program instructions stored on a computer readable storage medium and executable by one or more CPUs and/or GPUs. For example, they may be implemented as program instructions that, when executed, implement mechanisms to create a diffusion curve image and/or to convert a diffusion curve representation to an alternate representation in a scalable, portable format that may be rendered and displayed in a variety of other applications without requiring specialized graphics hardware.

Figure 1A:
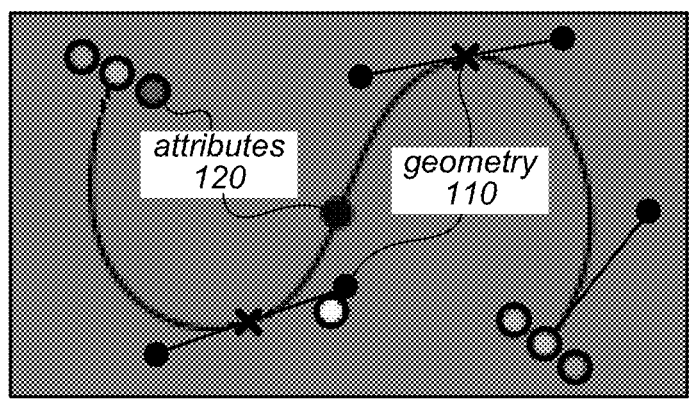
FIGS. 1A-1C illustrate various principles of diffusion curve editing, according to some embodiments.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Diffusion curves are a vector representation that simplifies the creation and editing of smooth gradients and blur, allowing the creation and capture of complex gradients within vector graphics images in a variety of styles. The system and methods described herein may allow images created using diffusion curves to be displayed and/or otherwise manipulated within a variety of applications (e.g., document creation and display, animation, etc.) without requiring the use of specialized graphics hardware (e.g., special-purpose graphics processors, or GPUs) to render the images. The system described herein may provide mechanisms to create diffusion curve images using a sketching type tools and to convert the resulting data representation to an alternate representation in a scalable, portable format usable in a variety of other applications. The methods described herein to generate the alternate representation may in some embodiments include a tessellation operation and an attribute assignment operation, and may produce a mesh of shapes for which values of diffusible attributes (e.g. color and blur) are assigned to each node. The alternate representation may in some embodiments be stored in the portable format for subsequent display by another application (i.e. an application other than the image editing application used to created the diffusion curve image) using standard interpolation techniques (i.e. standard techniques for interpolating colored polygons that are supported in the other application). The alternate representation may be resolution-independent and compact, as compared to the bit-mapped representations typically used to display diffusion curve images.

As previously noted, vector graphics have typically only encompassed linear or radial gradients, limiting the diversity of images that could be faithfully represented in a vector format. Gradient meshes (such as those used in Adobe® Illustrator®) provide the ability to create arbitrarily complex gradients in images with good results, but workflows for creation and manipulation of gradient meshes can be difficult and time-consuming, as they typically require a lot of manual editing. Diffusion curves present a different approach to complex gradients. While diffusion curves may provide the same realism as gradient meshes, they may in some embodiments allow for more traditional art creation workflows (e.g., direct sketching of basic shapes) using intuitive sketching tools. For example, workflows for creating and editing diffusion curve images may be guided only by the image content itself, and may not impose arbitrary topological constraints, such as a those imposed by a grid in a gradient mesh. With diffusion curves, colors may be defined on geometric control curves and diffused outwards. The total of all control curves may define a system of linear constraints that can be solved to obtain an image that upholds these constraints. With diffusion curves, large image areas may be defined by fairly sparse curve constraints, and these curves may be intuitive to place and edit. Diffusion curves are described in detail in U.S. Provisional Patent Application Ser. No. 61/197,250, entitled "Diffusion Curves: A Vector Representation for Smooth-Shaded Images", and filed Oct. 24, 2008, which is herein incorporated by reference in its entirety. In general, methods pertaining to the creation and manipulation of diffusion curves as described in that provisional patent application are assumed to be available in the systems described herein.

In the system described in the above-referenced provisional patent application, in order to display a diffusion curve image, diffusion operations are performed in a bit-mapped space (where the bitmap is essentially the display screen) using shader programs on a GPU. In that system, the output resolution is known and the system may be used to generate a bitmap with that resolution directly. Rendering diffusion curves using this approach may require the use of a powerful GPU, lest they take a very long time to render, making interactive operations (such as zooming, panning, or editing) practically intractable. In addition, including a diffusion curve drawing in a document (e.g., a file in PDF format) would have required a modification of both the PDF specification and the PDF viewer, in order to provide mechanisms for the viewer to perform the necessary diffusion processes and re-blurring operations. As previously noted, the system and methods described herein may provide an alternate (or intermediate) representation of a diffusion curve image that is scalable, portable, and may be easier and faster to render, without the use of a GPU. In addition, by converting a diffusion curve image into a portable format, it may be supported in other types of applications (e.g., applications directed to creation and/or display of documents).

In some embodiments, the alternate representation may comprise a mesh of triangles in which each node of each triangle may be assigned color values (e.g., values of one or more color channels) and these colors may be interpolated smoothly across the triangle. In other words, while a diffusion curve representation is a representation that smoothly varies between two diffusion curves, this alternate representation may be based on triangles such that instead of having an arbitrary interpolation between diffusion curves displayed on a screen, there may be a linear interpolation between the color values at the corners of each triangle. This diffusion curve conversion process (i.e. this triangulation process) may be thought of as providing a piecewise linear approximation of the original diffusion curve representation. In various embodiments, any smoothly varying diffusion curve may be approximated to an arbitrary degree with piecewise linear segments as part of this triangulation process. In some embodiments, the resulting output file format (e.g., a portable display format, such as PDF) may include support for interpolation of triangles. In other embodiments, the output file may be formatted according to another 3D file specification that supports the representation of colored triangles, such as VRML. Therefore, in some embodiments, a diffusion curve image converted to such a representation may be inserted into a file in the same format (or into a file in a compatible format) and when the image is displayed from within that file, it may be possible to zoom in without experiencing the pixelization artifacts common to raster-based graphics. In such embodiments, the converted image may be resolution-independent (within the limits of the piecewise linear approximation), and it may be easy and quick to render the image without the need for any special hardware.

The system and methods described herein may be better understood following a review of diffusion curve principles. Diffusion curves are geometric curves with various appearance attributes attached, namely color for each of the sides of the space that the curve divides, and blur magnitude to define how quickly color varies across the curve. This image representation may be convenient to use as it allows the sparse definition of colors along a few controlled primitives, while the final image is the result of diffusing these colors outwards and then blurring them according to a similarly diffused blur map. A diffusion curve representation may be well suited for producing two-dimensional (2D) drawings with smooth and controllable gradients. These gradients are typically controlled by two attributes (color and blur), and are typically used by an artist to manually depict shading and material color variations. A drawing created with diffusion curves may be conceptually thought of as a collection of Bézier splines (or other parametric curves or lines) for which the geometry has been augmented with additional attributes, e.g., two sets of color control points and a set of blur control points, in a diffusion curve representation. In other words, instead of storing only a thickness and a color, a diffusion curve may store colors (as many as the user desires) on each side of the space it divides and blur controls. The color control points correspond to color constraints on the right and left half spaces defined by each curve, and the blur control points define the smoothness of the transition between the two sides.

In some embodiments, a diffusion operation may begin with a pre-processing operation that includes interpolating the values of the control points along the geometric curves, e.g., linearly, quadratically, cubically, or using a spline-based interpolation approach. These interpolated values along the curve may in some embodiments be considered "fixed", i.e. they may not be subject to the subsequent diffusion process. In the subsequent diffusion process, each of the curves in the drawing diffuses its respective color(s) on each side of the curve to fill in the empty image space between curves. For example, in all places where attribute values are not explicitly defined (i.e. everywhere except to the immediate left or right of the geometric diffusion curves), attribute values may be computed by taking the explicitly defined values as constraints, and filling in values everywhere else, such that when the image is displayed, the changes in value from one position to the next (i.e. from one pixel to the next) are as small as possible. The colors may vary along the curves and are diffused outwards until they are blocked by and mixed with those defined by other diffusion curves. As previously noted, a diffusion curve may also store a blur value that controls the smoothness of the color transitions across the curve. In some embodiments, the diffusion operation may be formulated and solved as the solution to a Poisson equation. However, any other process that produces a reasonably smooth interpolation of constraints may also be suitable. These diffused attributes may then be used either directly (e.g. the colors), or as input for further processing (e.g. the blur values of the diffusion curves). The result resulting data representation may be a very compact vectorial representation of a complex image. The realism that may be achieved from the smooth transitions along the curves is difficult, if not impossible, to achieve using standard vector graphics techniques. As noted above, similar realism may in some cases be achieved with gradient meshes, but creation and manipulation of those meshes may require a lot of manual work due to the requirement to manipulate not only content-specific color values, but also to design and maintain an arbitrary grid topology.

Figure 1B:
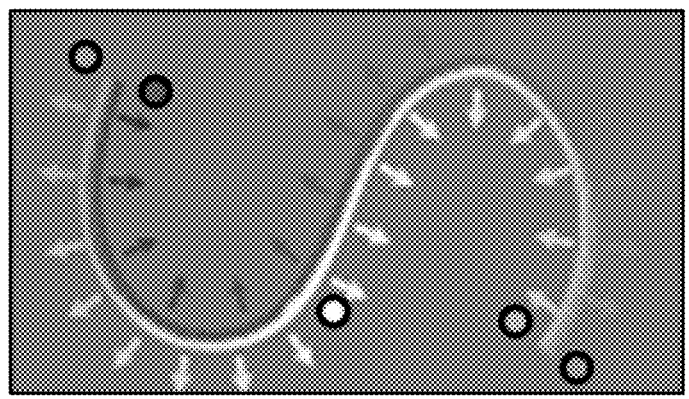
Figure 1C:
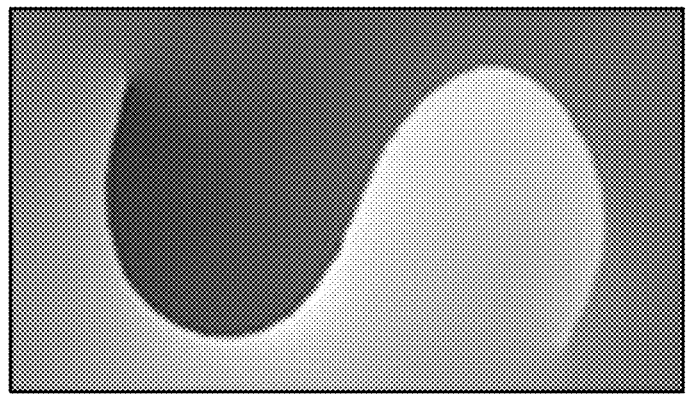

FIGS. 1A-1C illustrate the principles of diffusion curve editing, according to one embodiment. In this example, a typical diffusion curve image is generated by defining geometric curves in terms of geometric parameters 110 and attributes 120 along those curves (as in FIG. 1A), interpolating these attributes along the curve, and then diffusing them outward (as in FIG. 1B) to obtain the final image (as shown in FIG. 1C).

The system and methods described herein provide extensions to the original diffusion curves work, including vector-based rendering of diffusion curves, e.g., using Finite Element Method (FEM) based rendering. These extensions may provide improvements in the following areas:

Performance: The system of linear constraints, mentioned above, can be solved in a number of ways. The methods presented in U.S. Provisional Patent Application Ser. No. 61/197,250 require a lot of processing power. This processing power may commonly be provided by a GPU (Graphics Processing Unit), but not every GPU is powerful enough to perform the required operations, and not every computer system has a GPU available. The system and methods described herein may in some embodiments provide an implementation that does not require a GPU, but that still operates efficiently.

Scalability: One of the benefits of vector graphics is that they can be scaled (i.e. changed in size) without a loss of quality. The methods presented in U.S. Provisional Patent Application Ser. No. 61/197,250 for displaying diffusion curves using a GPU operate at the pixel level. Thus, greater magnification requires significantly more computation, and/or results in a magnified view that is only approximated. The system and methods described herein may provide an implementation that can zoom into vector images (e.g., within documents) without significant impact on performance or visual quality.

Portability: As the methods for rendering diffusion curves presented in U.S. Provisional Patent Application Ser. No. 61/197,250 rely on a GPU, using these methods to display documents that include diffusion curve images may only be performed on special purpose programs and/or on high-end platforms equipped with advanced GPU processing capabilities. The system and methods described herein may provide an implementation that leverages existing document standards (e.g., PDF), so that diffusion curve documents may be viewed (and in some cases edited) on any platform that supports the document standard.

While developed independently, the system and methods for scalable rendering of diffusion curves described herein are related to the methods for surface inflation described in U.S. provisional patent applications 61/037,240 and 61/091,262, which are herein incorporated by reference in their entirety. These applications describe systems and methods for generating a data representation of an inflated surface. The systems described therein include mechanisms for interpolating height information expressed as normal attributes attached to diffusion curves at various control points along the curves. More specifically, the methods described in these applications may include the following operations:

Defining boundary and internal geometric constraints of a 2D shape via 2D geometric curves with additional attribute values Triangulating the domain of the 2D shape Solving a sparse linear system on the resulting triangle domain, such that any original user constraints, specified by the geometric curves and corresponding attribute values, are upheld, and the solution varies smoothly everywhere else As described in these applications, user constraints may include geometric curves (i.e. diffusion curves) having height values and/or normals defined at certain curve locations. The result produced by such a system (i.e. an inflated surface) may have the same base-shape as the original geometric 2D shape, but may be inflated in the third dimension (generally orthogonal to the original 2D geometric plane) dependent on the height values and/or normal stored by the diffusion curve representation. Given the three-dimensional (i.e. inflated) shape of the result, many known three-dimensional (3D) based techniques (such as lighting, including material effects, and texturing) may be applied to it. While the use of normal attributes in such a system may facilitate the application of simple shading effects, artistic lighting may involve physically unrealizable shading. In some embodiments the system described herein may include input mechanisms by which a user can manually overlay colors from the supporting diffusion curves to suggest shading. In some embodiments, these colors may be disabled by setting their α-value (i.e. their transparency) to zero.

In various embodiments, a diffusion curve representation may include the originally defined diffusion curve parameters (i.e. colors on each side of a Bézier curve and blur along the curve), and may also include extended parameters, such as normal and/or shading attributes. These extended parameters may be specified along diffusion curves, interpolated, and diffused like the original diffusion curves parameters. In some embodiments, a complete representation of diffusion curves may include the following vector primitive:

P[ ] array of (x, y, tangent) tuples specifying the Bézier spline;
$C_l[\ ]$, $C_r[\ ]$ arrays of (r, g, b, α, t) the left- and right-side colors, and their position on the curve
Σ[ ] array of (σ, t) the blur values
$N_l[\ ]$, $N_r[\ ]$ arrays of (x, y, z, t); normals on each side A characteristic of the diffusion curves approach is that it has no concept of regions. Instead, the final attributes of a diffusion curve image (e.g., the color values at each location in the image) are defined by the interaction between different curves. In some embodiments, shading, as described above, may be combined with manual coloring, e.g., by assigning an alpha-channel to the color information of the diffusion curves. In such embodiments, the system may be configured to display automatically-generated shading where the alpha value is 0, to display manually-created coloring where the alpha value is 1, and to display a mixture of the two, by interpolating, depending on the value of alpha (assuming an operating range of 0 . . . 1). In other embodiments, other encodings and/or operating ranges may be applied. Linear interpolation may be employed in some embodiments, but any other suitable method may be used in others. Note that the mapping of 0 and 1 described above is arbitrary and may be reversed or otherwise modified without loss of generality.

The provisional patent applications referenced above describe systems and methods for generating a 3D surface representation by inflating a 2D representation using one or more of mean curvature constraints or surface normal constraints as internal or external boundary conditions to control the inflation. The values of these constraints may be specified at particular control points along the diffusion curves that define the image. In embodiments, different values may be specified for these constraints at different locations on a boundary. Various embodiments of the system may provide one or more user interface elements via which a user may specify or modify values for the constraints at locations on boundaries, and may provide one or more user interface elements via which a user may add, delete, or modify external or internal boundaries. The system may leverage characteristics of linear variational surface editing techniques to perform the actual inflation, whether mean curvature constraints, surface normal constraints, or both are used. Linear variational surface editing techniques, using some order of the Laplacian operator to solve for smooth surfaces, may provide simplicity and efficiency. The system may use a polygon (e.g., triangle) mesh to inflate the given curves. In some embodiments, the system may implement a linear system and work around its deficiencies, instead of using a slower, iterative non-linear solver that is not guaranteed to converge. In addition, the system may provide a greater range of modeling operations than conventional methods. While this approach may not allow the solution of the whole mesh as a unified system, it may provide an alternative patch-based approach that may be more intuitive to users, as the global solve in conventional methods may result in surface edits tending to have frustrating global effects. While the system is generally described in these provisional applications as using a triangle mesh, other polygon meshes may be used. The surface inflation tool may construct the 2-manifold surface that interpolates the input boundary or boundaries, and the surface may be computed as a solution to a variational problem. The surface inflation method implemented by the surface inflation tool may be formulated to solve for the final surface in a single, sparse linear equation, in one embodiment without requiring an additional strip of triangles at the boundary. In embodiments that employ surface normal constraints, additional ghost vertices may be used to control the surface normal internally and at surface boundaries. In such embodiments, the surface may be inflated by adjusting the surface normal constraints, thus rotating the boundary's ghost vertices around the boundary.

The system and methods described herein for scalable rendering of diffusion curves may employ techniques similar to some of the techniques described above in reference to inflating a surface. For example, the system described herein may employ a tessellation operation, and may operate in the tessellated domain. However, unlike the surface inflation system, the system described herein may generate (and store) an alternate representation of a 2D diffusion curve image based on a tessellation, and may operate in the tessellated domain to diffuse color and/or blur attributes of a diffusion curve image and to display the resulting images within applications that support the display of vector graphics images provided in a scalable, portable display format. In addition, rather than being directed to the generation of a 3D representation from a 2D vector image, the system described herein may be used to smoothly diffuse various types of diffusible attributes over a 2D vector image, and to efficiently generate, store, and display a scalable, portable representation of the 2D vector image.

Figure 2:
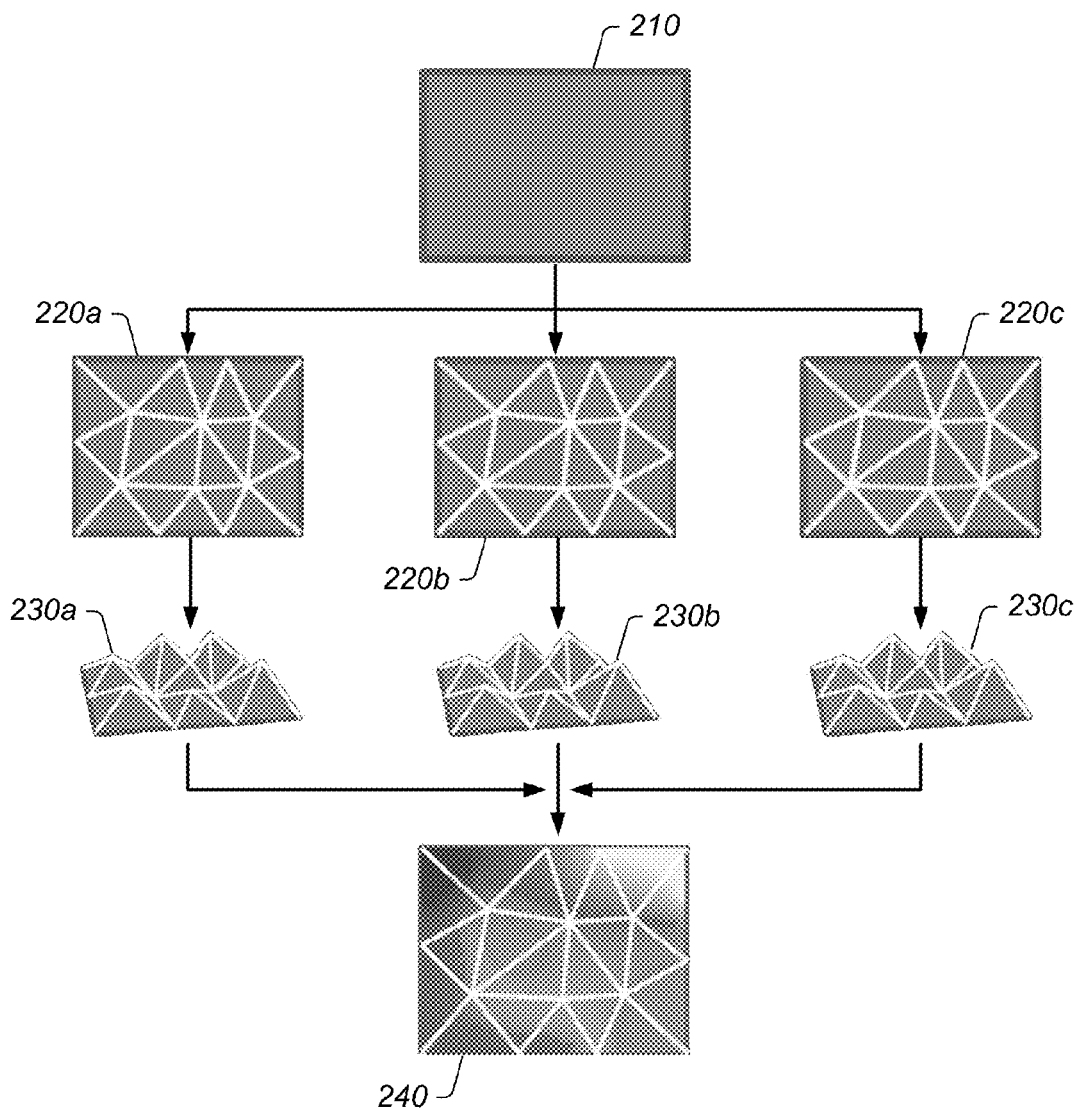
FIG. 2 illustrates the tessellation of three channels of a portion of a diffusion curve image to generate a piecewise linear approximation of the diffusion curve image, according to some embodiments.

In some embodiments, techniques similar to those used to inflate a surface based on surface normals may be applied to the generation of an alternate representation of a diffusion curve image that is scalable and portable. Conceptually, these techniques may be thought of as being applied to different color channels of the diffusion curve image as if the color value for each channel were a "height". In other words, in some embodiments, each of the color channels in a diffusion curve image (whether expressed in RGB, HSV, HSL, CMYK, or another format, with or without an alpha channel) may be processed as if it were a "height field" over the image, where the "height" corresponds to the color value of that channel (e.g., in a range 0.0 . . . 1.0, or 0.255, depending on the desired resolution or representation). This is illustrated in FIG. 2. In this example, element 210 represents a portion of a diffusion curve image in a 2D image plane. As illustrated in this example, the same in-plane tessellation operation may be applied to the image for each of three color channels, shown as 220a-220b. Note that in some embodiments, it may be possible to use a different tessellation for each color channel.

However, since a linear system would need to be set up to solve each tessellation, this approach may require more work to be performed and more data to be stored than if the same tessellation operation is applied to each of the channels. The color value at each node of the tessellation may be solved independently for each of the three color channels. The results are represented as height fields 230a-230b in FIG. 2. As illustrated in this example, the solutions for the color channels may be combined to define a color value at each node. To display the image, the color values for locations (e.g., pixels or collections of pixels) in between these nodes (i.e. for pixels in the interior of the triangles defined by the tessellation) may be computed from the color values at the nodes (e.g., using any suitable interpolation technique). In some embodiments, this technique may produce an alternate representation of the diffusion curve image that is scalable and portable (e.g., one that may be rendered for display using vector graphics techniques without the use of specialized graphics hardware).

In some embodiments, the method for generating an alternate representation of a diffusion curve image that is scalable and portable begins by defining an arbitrary image boundary. For practical purposes, this may in some embodiments be defined as a rectangular boundary, but it in general the boundary may have any arbitrary or desired shape. In various embodiments, the bounded shape may be non-rectangular, may contain holes (i.e. may include bounded regions that are excluded from the defined image domain), and/or may consist of multiple disjoint parts. In cases in which disjoint parts exist, each part may be processed separately, using the techniques described herein. The following discussion is focused on the possessing of a single portion of an image.

Figure 3A:
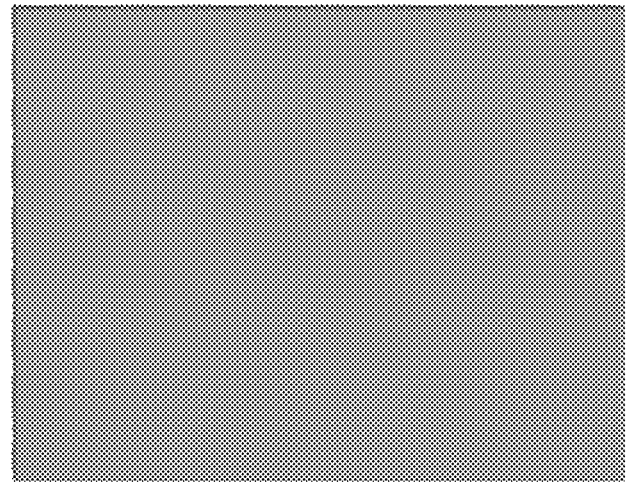
FIG. 3A illustrates an image boundary that lies in a flat (2D) ground plane, according to some embodiments.
Figure 3B:
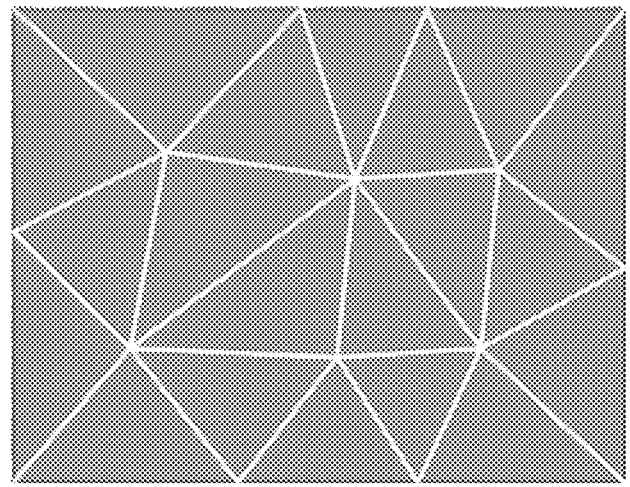
FIG. 3B illustrates a tessellation of the image boundary illustrated in FIG. 3A, according to some embodiments.

For illustration purposes, it may be assumed that the image boundary lies in a flat 2D ground plane, as shown in the example illustrated in FIG. 3A. The image boundary may then be tessellated, as shown in FIG. 3B. That is, the region enclosed by the image boundary may be subdivided into small elements. The shapes of these elements may be irrelevant, although their shapes may affect the mathematical implementation used to solve a linear system defined on a particular tessellation. Common tessellation methods may use triangles or quadrangles as element shapes, in some embodiments. The following discussion describes an example in which the tessellation element shapes are triangles. However, other tessellation element shapes (e.g., any n-gon shapes) may be used in conjunction with the relevant mathematical implementation. Note that since any n-gon itself may be reduced by triangulation, any n-gon based solution may be reduced to a triangulation, thus illustrating the generality of the approach described herein. A triangular tessellation may include a plurality of triangular tessellation elements in which each triangle consists of exactly three edges, connecting three nodes. FIG. 3B illustrates an example of a triangular tessellation.

In some embodiments, each node of each tessellation shape element may store the value of one or more attributes associated with the location of the node in the image plane. In various embodiments, these attributes may include, but are not limited to:
   Color (expressed as a multi-color channel tuple, e.g., RGB, XYZ, HSV, CMYK, etc.) which may also include an alpha channel
   Blur information, describing the local blur at the node location
   Other information, such as texture information, etc.

In some embodiments, the placement of nodes within the image plane may be guided by various factors, including, but not limited to:
   The image boundary shape and corresponding shape of the bounded image (including any holes)
   Internal user constraints (described in more detail below)
   Constraints on the maximum/minimum area of tessellation elements
   Constraints on the minimum/maximum angles of incident edges between or within tessellation elements
   Constraints on the maximum/minimum difference between neighboring attribute values Note that in some embodiments and/or in some cases, the original tessellation may have to be refined (i.e. further subdivided) in order to meet all of the above-mentioned constraints. For example, in one embodiment, the tessellation may be dependent on the results of the diffusion in an iterative manner. In this example, given an initial coarse tessellation, the algorithm may diffuse for a few steps, and then use the intermediate diffusion result to refine the tessellation where it is most necessary. This process may then be repeated until a user-defined precision limit is achieved.

Figure 4:
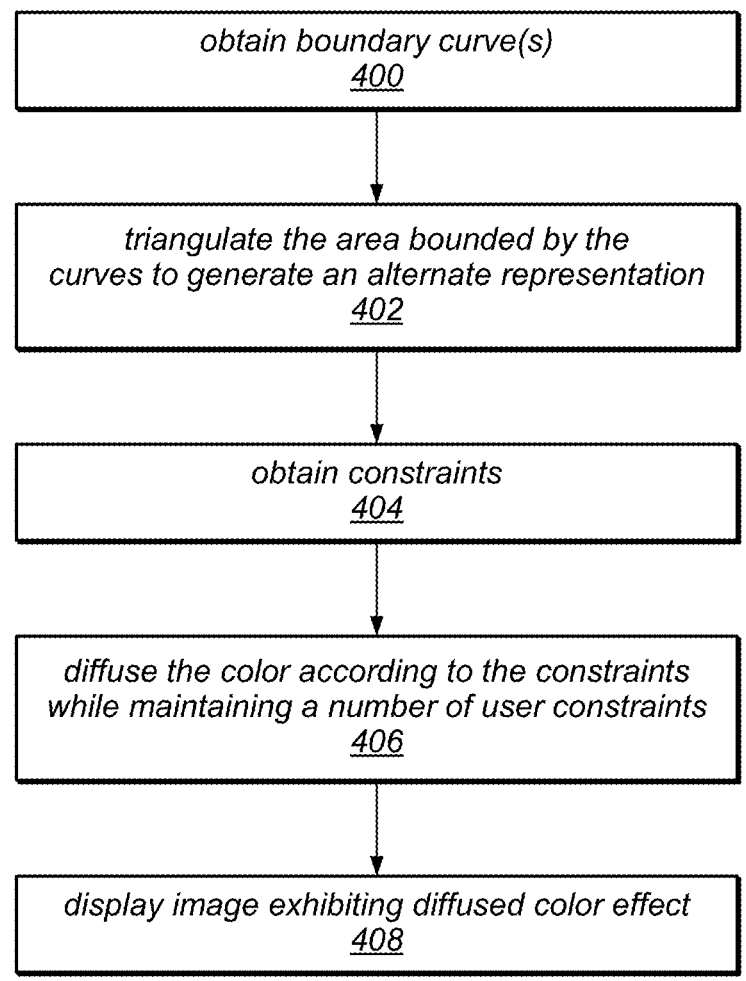
FIG. 4 is a flow diagram illustrating a method for scalable rendering of diffusion curve images, according to some embodiments.

One embodiment of a method for scalable rendering of diffusion curve images is illustrated by the flow diagram in FIG. 4. As illustrated in 400 of FIG. 4, the method may include taking a closed 2D boundary defined by one or more diffusion curves as input. As illustrated in 402, the method may include tessellating (e.g., triangulating) the area within the external boundary to generate an alternate representation of the image defined by the diffusion curves. As illustrated in 404 of FIG. 4, the method may include adding boundary constraints (e.g., color or blur constraints) to the input boundaries. As illustrated in 406, the method may include diffusing the color within the area defined by the closed boundary according to the specified constraints while maintaining a number of user constraints. Various examples of user constraints are described below, according to some embodiments. As shown in this example, the method may include displaying the image, along with the diffused color effect, using standard interpolation techniques for displaying colored polygons to render the image from the alternate representation, as in 408.

Figure 5:
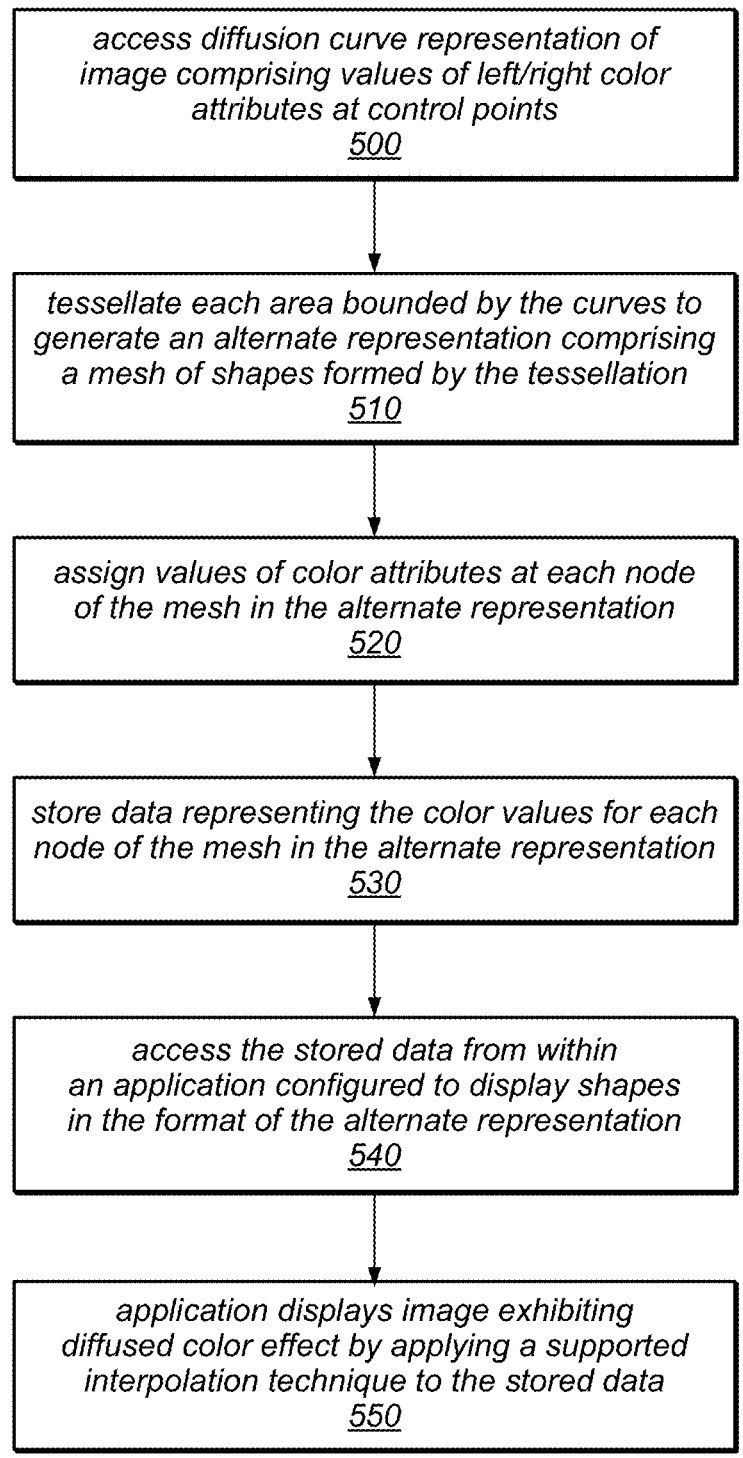
FIG. 5 is a flow diagram illustrating a method for converting a diffusion curve image into an alternate representation and displaying the image in an application supporting the alternate representation, according to some embodiments.

The system and method for scalable rendering of diffusion curves described herein may be further illustrated by the flow diagram in FIG. 5. As illustrated in this example, the method may include accessing a diffusion curve representation of an image. This image may be an image created using drawing tools of an image editing application that also supports the conversion of the image to an alternate representation, or may be an image that was previously created (e.g., using an image editing application) and stored as a diffusion curve representation. The diffusion curve representation may comprise values of left and right color attributes at one or more control points along each of the diffusion curves of the representation, as in 500. The diffusion curves included in the representation may define different portions of the image bounded by various combinations of the curves and the image boundary itself. As illustrated in 510 of FIG. 5, the method may include tessellating each of these areas to generate an alternate representation of the diffusion curve image in a portable, scalable format. The alternate representation may in some embodiments include a mesh of shapes (e.g., triangles) formed by the tessellation.

As illustrated in 520 of FIG. 5, the method may include assigning the values of color attributes at each node of the mesh in the alternate representation. In various embodiments, some of the color values may be specified in the diffusion curve representation of the image, while other values may be computed from values included in the diffusion curve representation, as described in more detail below. As illustrated in this example, data representing the color values for each node of the mesh may be stored in the alternate representation, as in 530. For example, in some embodiments, data representing each triangle of the mesh may be stored in a format that is compatible with a portable document format (e.g., PDF), and this data may include the color values for each vertex of each of the triangles of the mesh. As illustrated in 540 of FIG. 5, this stored data may be accessed from within an application configured to display data in the scalable, portable format. In some embodiments, the application may display the image, including the diffused color effect of the original diffusion curve representation, by applying a standard interpolation technique for displaying colored polygons to the stored data, as in 550. For example, the PDF format supports the display of triangles by interpolating the values at the vertices to compute the color values of all pixels on the boundary and in the interior of the triangles. As illustrated in this example, the method may include storing and/or outputting data representing an image that was defined using diffusion curves, but that has been converted into a format that is more compact, portable, and scalable than a bitmap of the image. For example, the data may be provided to a display component of an image or document editing application for display of the image and/or the data may be stored in an intermediate format (e.g., the alternate representation described above) by the image editing application for further processing by the application (or another application) or as a final image (e.g., written to main memory, a file, an archive, etc.).

Figure 6A:
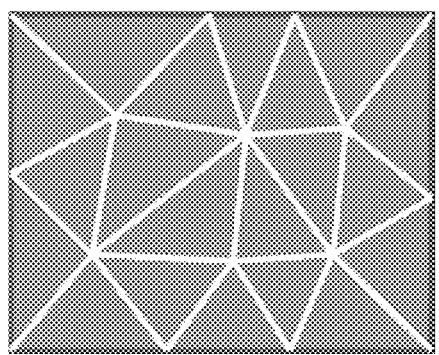
FIGS. 6A-6D illustrate the tessellation of a diffusion curve image and the addition of user constraints in displaying an alternate representation of the diffusion curve image, according to some embodiments.
Figure 6B:
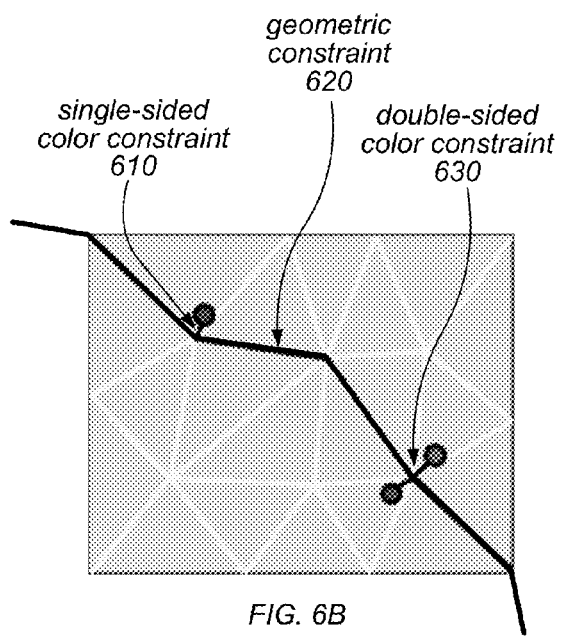
Figure 6C:
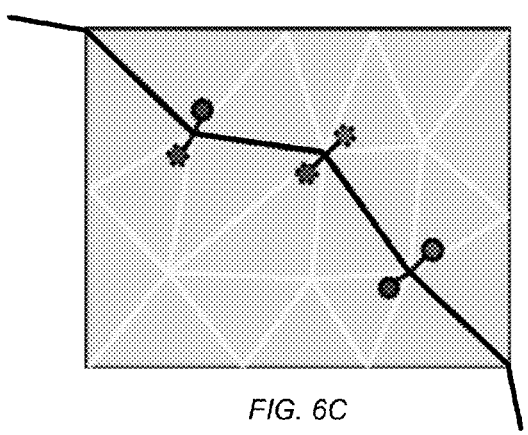
Figure 6D:
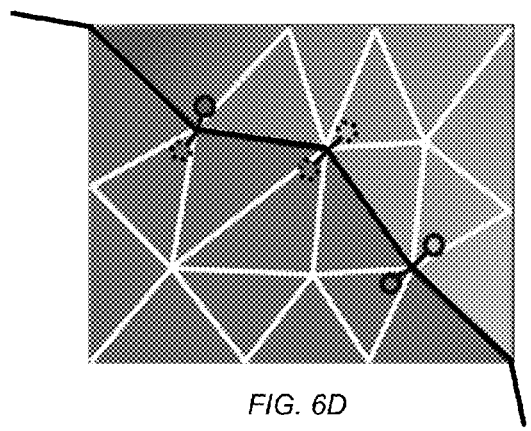

As described herein, converting a diffusion curve representation of an image to an alternate format may include tessellating the image. One such tessellation is illustrated in FIGS. 6A-6D. As noted above, in some embodiments a user may be able to specify various constraints (including geometric constraints) to be applied to an image, and which may affect the tessellation of the image. If the geometric user constraints are expressed as lines or curves within the image boundary, then it may be possible to assign two sets of attribute values to each geometric node, one for each side of the curve or line. FIG. 6A illustrates one possible tessellation as the result of user constraints illustrated in FIG. 6B. In this example, the user has drawn an internal geometric constraint 620 (black line). In addition, the user has chosen to define two attribute values for one of the control points (double-sided color constraint 620) and one attribute value for another control point (single-sided color constraint 610). As illustrated in this example, all attribute values not explicitly set by the user (i.e. the dashed circles illustrated in FIGS. 6C and 6D) may be interpolated from the explicitly set attribute values (i.e. the solid circles illustrated in FIGS. 6B-6D). The interpolation technique applied may be linear interpolation, or any other suitable data-fitting method, in various embodiments. The image colors near the control points are as indicated by the attribute constraints themselves, whereas image colors everywhere else may be computed by solving a system of linear equations, as described in more detail below. In this example, FIG. 6D illustrates the result of the diffusion of colors within the image boundary, dependent on the constraints shown in FIG. 6B.

Note that in the examples described herein, all nodes with constrained attributes (i.e. nodes that include constraints defined explicitly by the user or interpolated from those constraints by the system) may be considered "constrained", whereas all other nodes may be considered "unconstrained".

In some examples, nodes may be referred to as vertices, especially when referring to the corners of triangles or other shapes of a mesh.

Figure 7A:
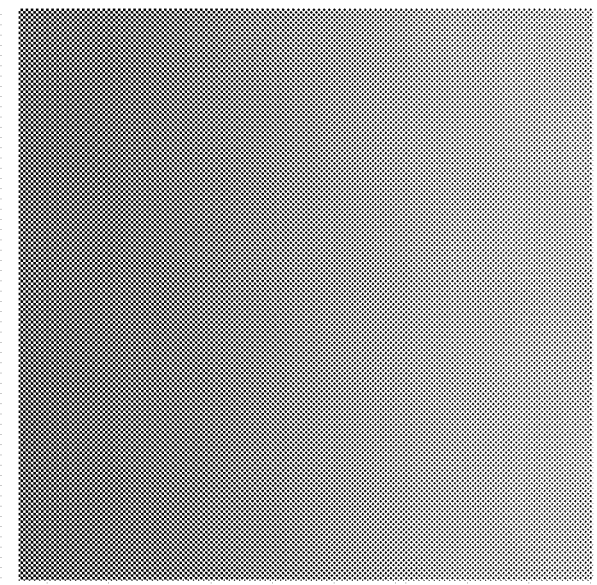
FIG. 7A illustrates a bounded portion of an image, according to some embodiments.
Figure 7B:
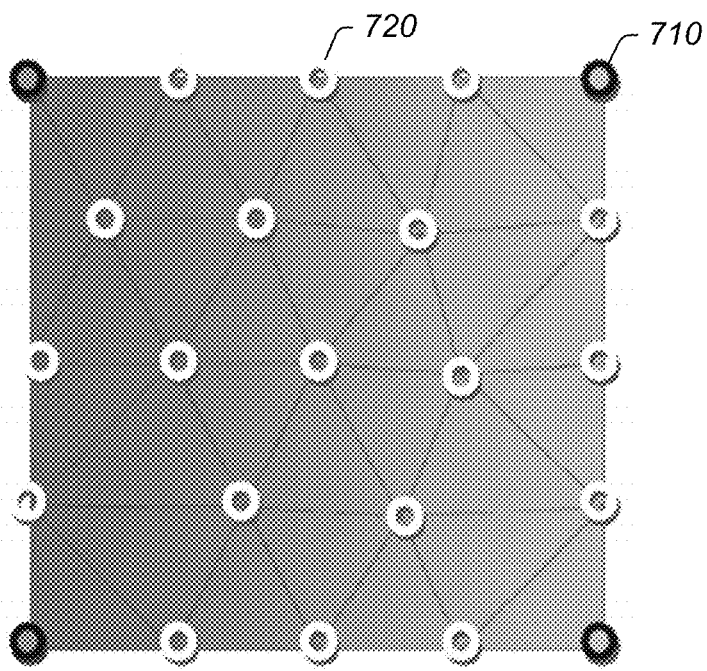
FIG. 7B illustrates a tessellation computed from the image portion illustrated in FIG. 7A, according to some embodiments.

Another example of the tessellation of an image is illustrated in FIGS. 7A-7B, according to one embodiment. In this example, the image depicted in FIG. 7B was computed from FIG. 7A as follows:

The user specified node positions (e.g., node 710), which are shown in FIG. 7B as black circles, along with color attributes (e.g., a darker color for those on the left edge, and a lighter color for those on the right edge). In this example, the specified node positions coincide with the corners of the image boundary.

The system tessellated the image shape, while considering the tessellation constraints, including the user constraints. Nodes of the resulting tessellation have undefined attributes, and are marked with white circles (e.g., node 720).

The system then automatically assigned colors to un-colored nodes, such that the transition of colors is as smooth as possible everywhere. Mathematical details for assigning the colors are described in more detail herein, according to one embodiment.

Figure 8A:
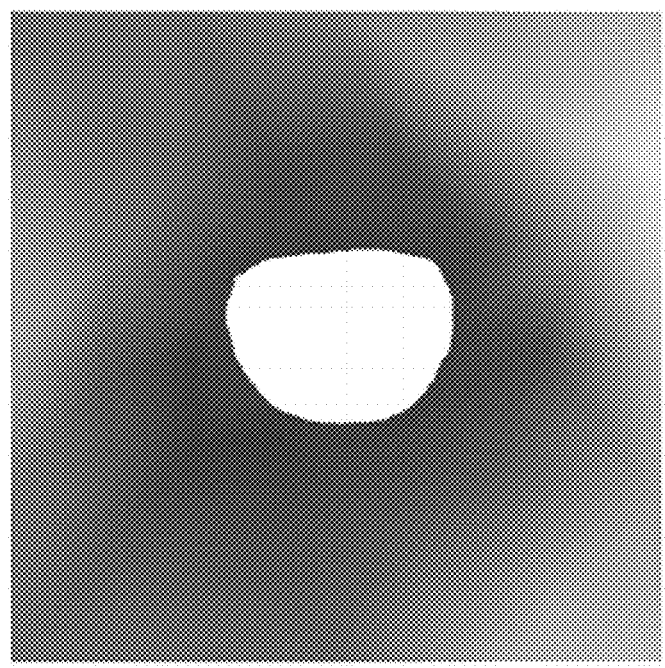
FIG. 8A illustrates an image in which a user has drawn a round-shaped constraint, according to some embodiments.
Figure 8B:
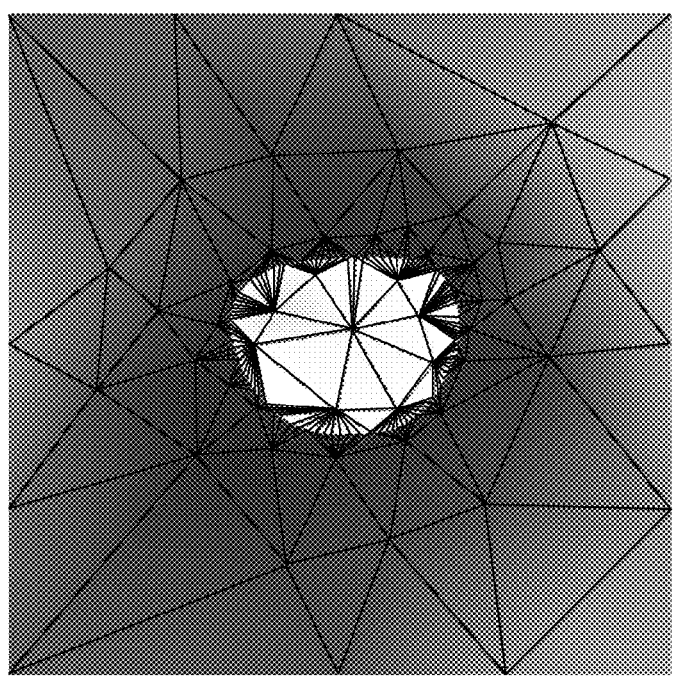
FIG. 8B illustrates a tessellation that has been modified to accommodate the user constraint illustrated in FIG. 8A, according to some embodiments.

As previously noted, tessellation of an image (including node placement) may in some embodiments be affected by geometric constraints, color (and/or blur) attributes, and/or other user-constraints. One example of how node placement may be affected by a geometric constraint is illustrated in FIGS. 8A-8B. In this example, the user has drawn a round-shaped user constraint (as shown in FIG. 8A). In this example, the system automatically adapted the tessellation of FIG. 7B to accommodate the user-drawn geometric constraint illustrated in FIG. 8A. The resulting tessellation is illustrated in FIG. 8B.

Figure 9:
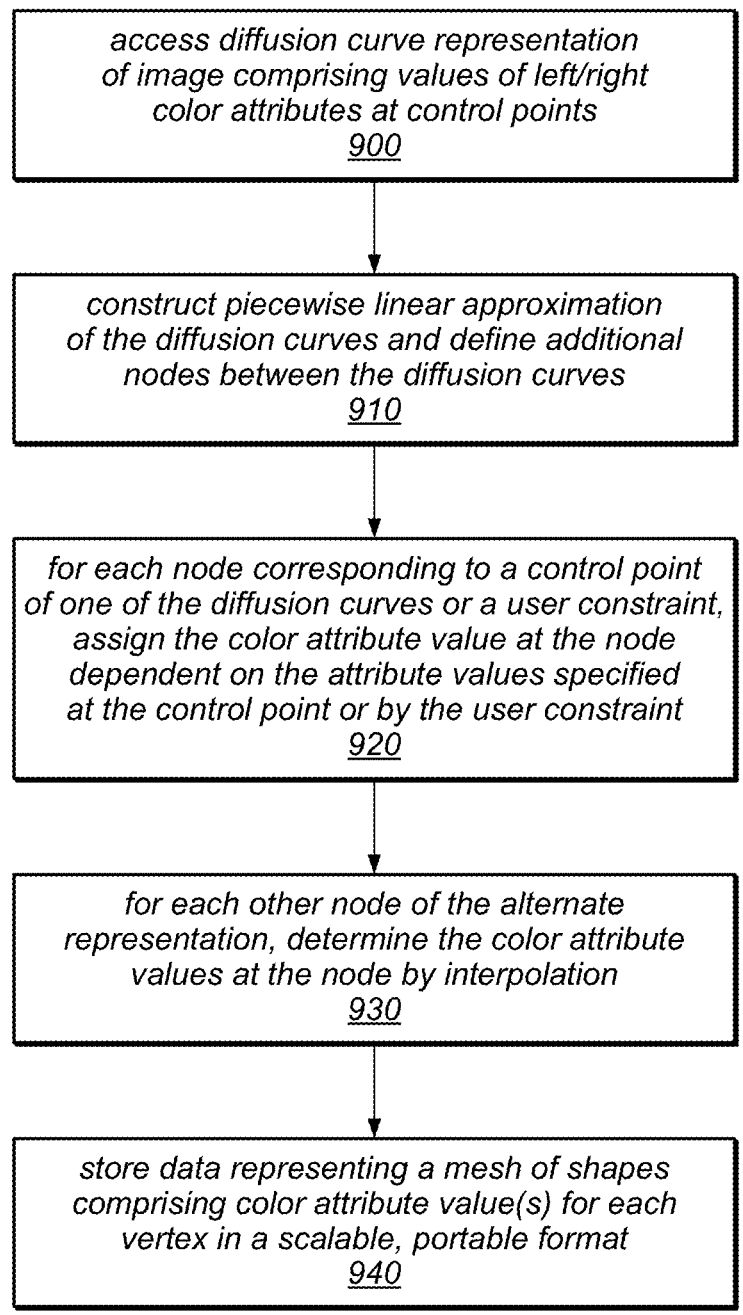
FIG. 9 is a flow diagram illustrating one embodiment of a method for generating an alternate representation of a diffusion curve image using tessellation.

One embodiment of a method for generating an alternate representation of a diffusion curve image using tessellation is illustrated by the flow diagram in FIG. 9. As illustrated at 900 in this example, the method may include accessing a diffusion curve representation of an image that includes values of left and right color attributes at various control points along the diffusions curves defining the image. As in previous examples, the image may be an image created using drawing tools of an image editing application that also supports the conversion of the image to an alternate representation, or may be an image that was previously created (e.g., using an image editing application) and stored as a diffusion curve representation.

As illustrated in this example, the method may include constructing a piecewise linear approximation of the diffusion curves defining the image, as in 910. For example, each diffusion curve may be approximated using piecewise linear segments, the endpoints of which constitute nodes in the alternate representation being constructed. Note that a straight-line diffusion curve may be approximated (or exactly represented) using a single straight-line segment. In addition, the method may include defining additional nodes of the alternate representation in the portions of the image between the piecewise linear segments that approximate the diffusion curves (e.g., to define a mesh of triangles between the diffusion curves). In some embodiments, user constraints may be added to the alternate representation (i.e. the tessellation), such as geometric constraints, single-sided constraints, or double-sided constraints. As illustrated in FIG. 6B, these constraints may be used to specify the values of one or more attributes (e.g., color and/or blur) at particular locations within the image. In such embodiments, these locations may also be considered nodes of the alternate representation, whether or not they correspond to a control point of a diffusion curve or an endpoint of a piecewise linear segment approximating a diffusion curve.

As illustrated in 920 of FIG. 9, the method may include assigning color values (e.g., right and left color values) to each node of the alternate representation that corresponds to one of the control points of the diffusion curves or to a node at which user constraints have been specified. For example, for a node that corresponds to a control point in the diffusion curve representation of the image, any values assigned to the attributes at that control point may also be assigned to the node in the alternate representation. Similarly, any values specified as a user constraint at a particular location in the image may also be assigned to the corresponding node in the alternate representation.

As illustrated in this example, the method may include, for each other vertex of the alternate representation, determining the color attribute values at the vertex by interpolation, as in 930. Examples of various methods for interpolating the attribute values are described in more detail below. As shown in 940 of FIG. 9, the method may include storing data representing a mesh of shapes comprising color attribute value(s) for each vertex of the mesh (i.e. each node of the piecewise linear approximation of the diffusion curve image) in a scalable, portable format. For example, in some embodiments the data may be stored in a format that is compatible with a portable document format (e.g., PDF).

Tessellation/Triangulation

As previously noted, in some embodiments, the system described herein may tessellate the area bounded by the curves as part of converting a diffusion curve drawing to an alternate representation. For example, in some embodiments, the system may include a diffusion curve conversion tool, which may invoke a tessellation operation. In performing the tessellation, some embodiments of the boundary curve conversion tool may restrict the representation to a triangle mesh that is obtained by triangulating the surface bounded by the image boundary. Any of various triangulation methods may be used to generate a high-quality triangulation. In some embodiments, the system may maintain a maximum area constraint (which may be provided as a configurable option in the triangulation method) to prevent rendering artifacts due to very large triangles. As noted above, other types of constraints may also be considered.

An advantage of solving for the diffused color image using a triangle mesh (as opposed to a regular grid) may be its efficiency due to mesh adaptivity. In other words, the triangle mesh may be specified to have high detail only near complicated constraints, and to be coarse where there are not many constraints. In one embodiment, the mesh connectivity may not be updated as the image color is diffused. In other embodiments, the mesh may dynamically be made denser in parts of the image that have high color gradients, which may be more efficient and smoother in terms of rendering.

Color Diffusion

As indicated at 406 of FIG. 4, the system may be configured to diffuse the color according to the specified constraints while maintaining a number of user constraints. In one embodiment, the unconstrained parts of the surface may be obtained by solving a variational system that maintains smoothness of color transitions. Smoothness may be maintained to achieve soft color transitions between user constraints. In this way, the color in those regions may be defined implicitly using only a small number of explicit constraints.

In one embodiment, the variational formulation may be based on the principles of partial differential equation (PDE) based boundary constraint modeling, where the Euler-Lagrange equation of some aesthetic energy functional is solved to yield a smooth color diffusion. For example, in some embodiments the system may use a 'thin-plate spline' as the desired diffusion method, and the corresponding Euler-Lagrange equation may be used for the bi-harmonic equation. In such embodiments, for all free vertices at position x, the PDE $\Delta^2 (x)=0$ may be solved. In this example, x may represent the "height" (representing the color value) at a particular position in the triangulated mesh. Therefore, if x is single-valued, the solution may correspond to a single height-surface (i.e. a grayscale image). For a color image, x may be a multi-valued color, and a solution for each of the color channels may be solved independently, as described above. The solution of this PDE may yield a $C^2$ continuous surface everywhere except at the position constraints (where the surface can be either $C^1$ or $C^0$ continuous). In some embodiments, the system may use cotangent-weight based discretization of the Laplacian operator $\Delta(x)$.

The fourth-order PDE ($\Delta^2 (x)=0$) may be too slow to solve interactively. Therefore, in one embodiment, the system may convert the non-linear problem into a linear one by assuming that the parameterization of the surface is unchanged throughout the solution. In practice, this means that the cotangent weights used for the Laplacian formulation may be computed only once (using the flat, non-inflated surface) and may be subsequently unchanged as the colors are diffused. This approximation has been used extensively for constructing smooth shape deformations, but it may significantly differ from the correct solution in certain cases. Instead of correcting this with a slower, sometimes-divergent, iterative non-linear solver, in embodiments the system may characterize the linear solution and use its quirks to provide extra dimensions of artist control.

One advantage to using a linear system in the solver may be that the linear system has a unique solution. In contrast, non-linear systems may generate multiple solutions (for example, a global and local minimum). Thus, using a non-linear system, the solver may get trapped in a local minimum, possibly yielding an undesired solution (i.e., the global optimum may not be found). Different non-linear solvers may arrive at different local minima. Thus, using a linear system may provide consistency and efficiency. A trade-off to using a linear system may be that the resulting color diffusion may not be quite as smooth as a globally optimal solution to a non-linear system. For artistic purposes, however, a solution produced by a linear system may in most cases be sufficient.

Specification of Color Constraints

The following describes the formulation of a variational linear system according to embodiments that use color constraints. In such embodiments, a linear system Ax=b may be implemented, where the matrix A is a sparse n×n matrix (where n is the number of unconstrained vertices times the number of color channels, c, to be diffused, e.g. 3× number of unconstrained vertices for an RGB image). The matrix A may represent the local geometric relationships between the vertices and their neighbors and thus may dictate how the color information is transferred between vertices. The vector x of length n may represents the color values of unconstrained vertices and the vector b of length n represents the known quantities, i.e. the color values of constrained vertices.

For all c color coordinates (corresponding to the c color channels) of every unconstrained vertex, an equation may be formulated that is linear in terms of the vertex' neighbors. In some embodiments, the formulation may be based primarily on a method of discrete geometric modeling, with the addition of constraint types. One method has been described in the art to formulate a linear system that can handle smooth or sharp internal constraints. However, the formulation requires a strip of triangles to complete the one-ring neighborhood of the boundary vertices. Generating this strip of triangles, especially when the boundary curve has large concavities, is not trivial. Therefore, some embodiments of the system described herein that use a color constraint may provide a mechanism to "fake" these triangles with locally correct "ghost" vertices.

One embodiment may use a conjugate-gradient implementation to solve the linear system $A\bar{x}=\bar{b}$. Since the matrix A is sparse, symmetric and positive-definite, other embodiments may factorize the matrix, which may decrease iterative update times. For example, in one embodiment, a Cholesky decomposition of the matrix A may be performed, and in another embodiment, a direct solver may be used to solve the linear system. Other solvers may be used to solve the linear system in other embodiments. For example, a sparse Cholesky solver or a conjugate-gradient solver may be used. Other techniques such as multi-grid solvers may also be used.

Figure 10:
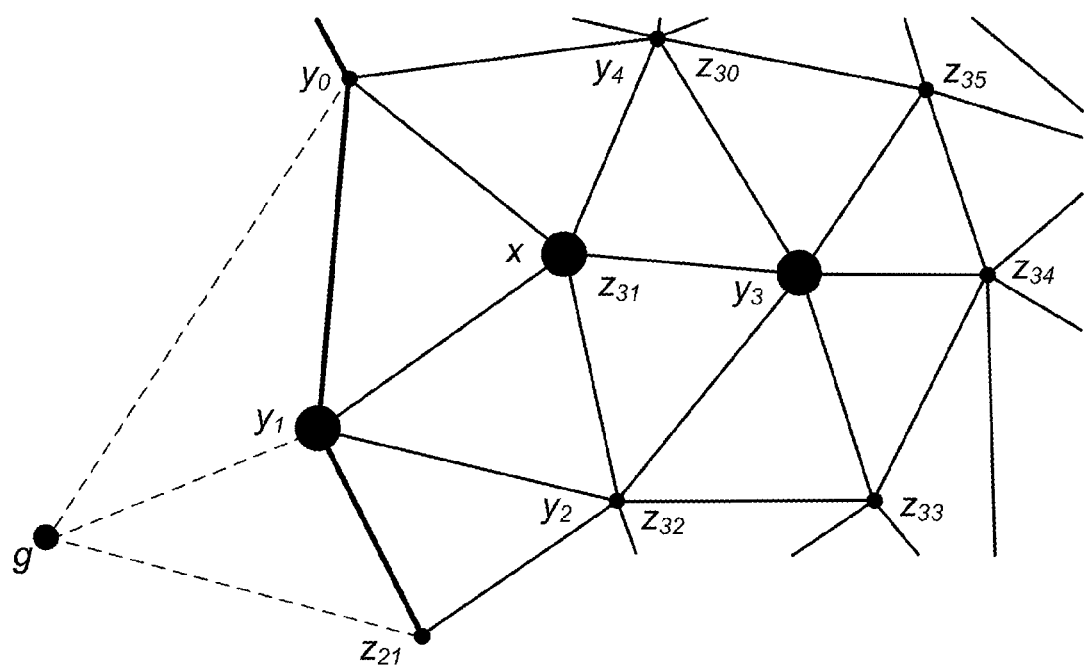
FIG. 10 illustrates a mesh vertex of position x and one-ring neighbors $y_i$, according to one embodiment.

The techniques described above may be further illustrated by way of example. FIG. 10 illustrates a mesh vertex of position x and one-ring neighbors $y_i$ according to one embodiment. FIG. 10 shows various variables used in the equations below. In this example, vertex x has neighbors $y_0$, $y_1$ on the boundary, and neighbors $y_2$, $y_3$, $y_4$ in the interior with a full one-ring neighborhood. Each boundary vertex has its own ghost vertex and two corresponding ghost triangles (for example, $y_1$ has g) to artificially provide the required one-ring neighborhood.

Consider a mesh vertex of position x and one-ring neighbors $y_i$ as shown in FIG. 10. A steady-state solution for color values, considering boundary constraints, may in some embodiments be found by solving the Laplace equation $\Delta x=0$.

The Laplacian at a mesh vertex may be given by its one-ring neighborhood:

$$\Delta x = \Sigma_i w_i(x-y_i)$$

where $w_i$ are the cotangent weights scaled by inverse vertex area (where the vertex area is the area defined by the one-ring neighborhood of the vertex, i.e. as the sum of all triangles which are constructed by using the given vertex). This expands finally to:

$$\Delta x = \Sigma wx - \Sigma wy - \Sigma wz = 0$$

where $z_{ik}$ refers to ghost vertices where necessary to complete a one-ring. In one embodiment, constrained vertices may be treated as absolute constraints, so that their positions are moved to the right hand side of the system.

Constructing such equations for every free vertex gives the linear system $Ax=b$, whose solution, x, may provide the desired color image. Since the construction is not symmetric and may be over-constrained, it may be solved using equations similar to those used to process normal constraints by the surface inflation tool described above.

Placement of Ghost Vertices

In one embodiment, for each patch of a mesh surface, a canonical view direction may be assumed to be known. For example, this may be the direction from which the original boundary constraints were drawn. In such embodiments, an 'up' vector which points towards the source of this canonical view may be derived. Ghost vertices may then be placed in a plane perpendicular to the 'up' vector, and normal to the constraint curve of their parent vertex. In other embodiments, the ghost vertices may be extended to lie within the image plane. In one embodiment, each ghost vertex may be placed at the same fixed distance d from the curve. For example, in FIG. 10, assuming a vector out of the page u, the ghost vertex g may be positioned at:

$$y_1 + d(u \times (z_{21} - y_0))/\|u \times (z_{21} - y_0)\|$$

In some embodiments, once placed, the ghost vertices may be rotated about the tangent of the constraint curve (the boundary) to change the normal direction. Note that ghost vertices may be added for both external and internal boundaries.

Internal Constraints

In some embodiments, the user may draw internal boundaries as internal position constraints and may also specify boundary constraints (e.g., mean curvature and/or color constraints) for the internal boundaries. Upon adding a new internal boundary, the linear system $A\bar{x}=\bar{b}$ needs to be re-initialized and solved. Note that the re-solving may be performed differently for new internal boundaries comprising color constraints than for new internal boundaries comprising mean curvature constraints.

Storage/Display

Once the linear or non-linear matrix system is solved and the colors are diffused over the triangulated image boundary, a unique set of colors may be assigned to each node of a triangle. Note that many (if not most) nodes may be shared by several triangles, and that nodes can contribute different colors to different triangles, depending on the side of a geometric user constraint on which a given triangle lies (see FIG. 6D). One way of storing this color information may be to store three color values for each triangle (e.g., one for each corner of the triangle). However, any other similar scheme may be used, in various embodiments. Note that in one embodiment, to address the issue of having two values on either side of a user-constraint curve, the user (or the system) may create an artificial hole that is extremely thin (e.g., the user-defined curve may be thought of in terms of a sheet of paper into which a cut has been made to form an infinitely thin ellipse). In this example, each vertex on the user-constraint curve may be duplicated such that there are corresponding vertices on each side of the ellipse that share the same x and y coordinates, but whose heights are computed independently (i.e., as if the paper on the two sides of the cut can be moved to different heights).

A set of triangles with associated colors (such as an alternate representation of a diffusion curve image generated as described herein) may in some embodiments be displayed on the screen using the OpenGL command language. In other embodiments, an image may be rendered from such a representation using any other computer executable method that is capable of handling the display of tri-colored triangles, and that performs the smooth interpolation of colors from the corners of the triangle to the interior of the triangle. In some embodiments, a representation comprising a set of triangles may be encoded and stored in any document or storage format capable of encoding and storing tri-colored triangles. To ensure the correct display of such a document or storage format, the computer executable program displaying such document or storage formats must be capable of displaying tri-colored triangles, including the smooth interpolation of colors from the corners of the triangle to the interior of the triangle. As previously noted, one such format is the Adobe portable document format (PDF), but any similarly capable formats may be applied, in various embodiments.

Applications of Embodiments

Applications of the techniques described herein may include one or more of, but are not limited to, enhancing photographs or other images using diffusion curves, creating 2D vector images, creating 2D animations, importing 2D vector images and/or animations into documents or other files, and rendering 2D vector images in systems that do not include specialized graphics hardware (e.g., GPUs). Examples of some of these applications are illustrated in various Figures included herein. Some embodiments of the diffusion curve conversion tool described herein (or a module thereof) may be implemented, for example, as a plug-in for 2D art design tools such as Adobe® Illustrator®, Inkscape, or GNU Gimp or as a plug-in for other types of image processing applications. In other embodiments, such a tool or module may be implemented, for example, as a stand-alone program or utility, or as a library function. In various embodiments, the tools described herein may obtain, manipulate, and output digital images in any of various digital image formats.

In some embodiments, the system and methods described herein may make it possible to insert, display, and/or modify the display of a diffusion curve image in a file or document using a portable display format. In other words, the system and methods described herein may allow diffusion curve images to be used in a variety of applications using standard display features of those applications, and without requiring the use of a specialized graphics processor (GPU) to render the diffusion curve images. One method for applying the system and methods described herein is illustrated by the flow chart in FIG. 11. In this example, the method may include creating a diffusion curve image, converting it into an alternate representation in a scalable, portable format, inserting the image into a file or document within another application, and modifying the display of the image within the other application.

As illustrated at 1100, the method may include opening an image editing application, e.g., to create a new diffusion curve image or to edit an existing diffusion curve image. In some embodiments, this may include the image editing application accessing data representing an existing 2D image in response to the data being imported into the application, or may be resident in memory accessible to the application as a result of being imported previously, or as a result of being created and/or modified by the application prior to the desired editing operation. The data accessed may represent a whole image or a portion of an image, in different embodiments. In some embodiments, a user may select a drawing, an image, or a portion of drawing or an image to be edited using a GUI of an image editing application.

A drawing session may begin with a user sketching one or more vector curves, and then attaching various color values along the curves to create complex colors and shadings. Therefore, as illustrated in 1110 of FIG. 11, the method may include adding a vector curve to the new or existing diffusion curve image using a drawing or sketching tool in a graphical user interface of the image editing application. In this example, the method may include the image editing application receiving input defining one or more diffusion curves for the 2D image via a GUI of the image editing application indicating one or more geometric curves drawn by a user using a drawing tool of the GUI. These curves may comprise Bézier curves or other parametric curves, in various embodiments. In some embodiments, the method may include the image editing application receiving input defining the shape of an image element, i.e. shape contour lines, usable to create a 2D drawing representing an existing image.

The vector curves (e.g., Bézier splines) may support control points at which various parameter values may be defined. For example, in some embodiments, various attributes (e.g., color and/or blur) may be attached to control points on the left and/or right sides of a diffusion curve when the curve is created (i.e. while the user is sketching a drawing). In other embodiments, such attributes may be attached to control points of the diffusion curves at a later time. In the example illustrated in FIG. 11, the method includes defining one or more control points along the curve, as in 1120. For example, the method may include the image editing application receiving input via a GUI of the image editing application indicating one or more locations within the 2D image at which a user has specified that control points should be attached. In various embodiments, such control points may be attached to the "left" and/or "right" side of the diffusion curve at any position along the curve (i.e. on either side of the curve, using an arbitrary frame of reference). In other words, the attribute control points may in some cases coincide with the geometric control points of the diffusion curve (e.g., a Bezier curve), but they may not be limited to positions defined by these geometric control points.

As illustrated in 1130, the method may include specifying values for left and right color attributes at the control points. As described herein, these left and right attributes apply, respectively, to the image (or an area thereof) as divided into left and right portions by the curve at the control points. In some embodiments, the diffusion curve representation may include support for all parameters at each control point and the user may optionally decide which parameters are considered active for any given control point. In some embodiments, the method may include the image editing application receiving input associating one or more diffusible attributes with each of the control points. For example, the method may include the image editing application receiving input via a GUI of the image editing application indicating the values of various parameters that a user has specified for the left and/or right side of the curve at each control point. In various embodiments, these attributes may include color and/or blur attributes, as described in more detail herein (e.g., with reference to FIGS. 1A-1C). While in this example, colors are defined after the curve is drawn, in other embodiments, diffusion curves may contain pre-loaded colors for the left and right sub-spaces they define, or the system may adaptively sample a template image to derive colors automatically as the user draws one or more diffusion curves.

Figure 11:
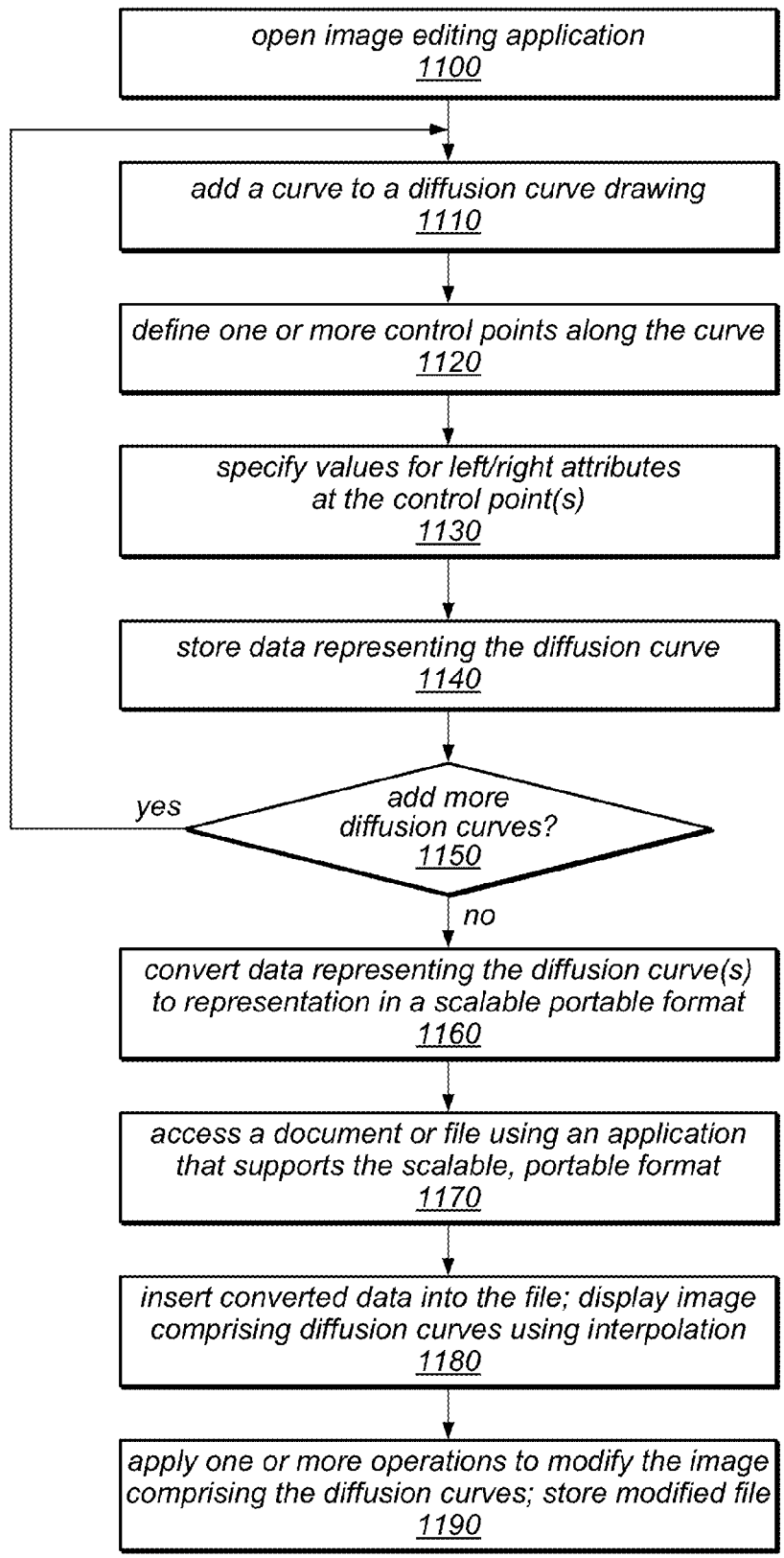
FIG. 11 is a flow diagram illustrating a method for creating a diffusion curve image, converting the diffusion curve image into a scalable, portable format, inserting the image into a document, and modifying the image being displayed, according to various embodiments.

As illustrated in 1140 FIG. 11, the method may include storing data representing the diffusion curve. For example, the data may comprise a vector representation of the diffusion curve and may include the values of one or more diffusible attributes specified for one or more control points along the diffusion curve. The data may be stored in a new file created at the beginning of the editing session (e.g., in the case that a new diffusion curve image is being created) or may be added to an existing file (e.g., in the case that an existing diffusion curve image is being modified). As illustrated in this example, if the user wishes to add more diffusion curves (shown as the positive exit from 1150), the operations illustrated as 1110-1140 may be repeated for the one or more additional diffusion curves. If no additional diffusion curves are to be added (shown as the negative exit from 1150), the method may continue at 1160.

Because the diffusion curves are vector representations, they are resolution independent (i.e. can be zoomed in on without loss of quality), continuously editable, and compact, and they may support animations (e.g., in applications such as Adobe® Flash® animation). However, as described above, rendering them using bitmaps may require a lot of computing power, specialized graphics application programs, and/or specialized graphics hardware (such as a GPU). Therefore, in some embodiments, the method may include converting the data representing the diffusion curves into an alternate representation in a scalable, portable format suitable for use in a variety of applications, as described above. This is illustrated as 1160 in FIG. 11.

In this example, the method may include accessing a document or file using an application that supports the scalable, portable format, as in 1170. For example, the method may include the image editing application receiving input identifying a document in a portable display format (e.g., PDF) to which a diffusion curve image is to be added. As illustrated in 1180, the method may include inserting the alternate representation of the diffusion curve image into the document, and displaying the image (including the diffused color effects of the diffusion curve image) using a standard interpolation technique for displaying colored polygons that is supported in the application. For example, the PDF format includes support for interpolation of data specified using triangles. Therefore, an alternate representation of the image comprising a mesh of triangles for which various attributes are defined at the vertices, as described herein, may be inserted into a PDF formatted file and may be rendered easily and quickly by a PDF reader (or viewer) without the need for specialized graphics hardware. For example, the method may include the application outputting data representing the document, including the 2D image and reflecting the diffusion of the diffusible attributes. In various embodiments, the data may be provided to a display component of the image editing application for display of the 2D image to the user and/or the data may be stored in an intermediate format by the image editing application for further processing by the application (or another application) or as a final image (e.g., written to main memory, to the same or a different file, to an archive, etc.).

Because the alternate representation is also a vector-based representation, it is resolution-independent (within the limits of the piecewise linear approximation from which it was constructed) and can support zooming in. As illustrated in 1190 of FIG. 11, one or more global and/or local manipulation operations (e.g., standard vector graphics operations) may be applied to the inserted image to modify the display of the image. For example, because alternative representations of diffusion curves based on a mesh of shapes are vector representations, operations such as resizing, zooming, or adding animation effects may be applied to these representations easily and without loss of quality, in various embodiments. Once the inserted image has been modified within the document, the modified file (including the inserted and/or modified image) may be stored (e.g., in its original format).

Figure 12:
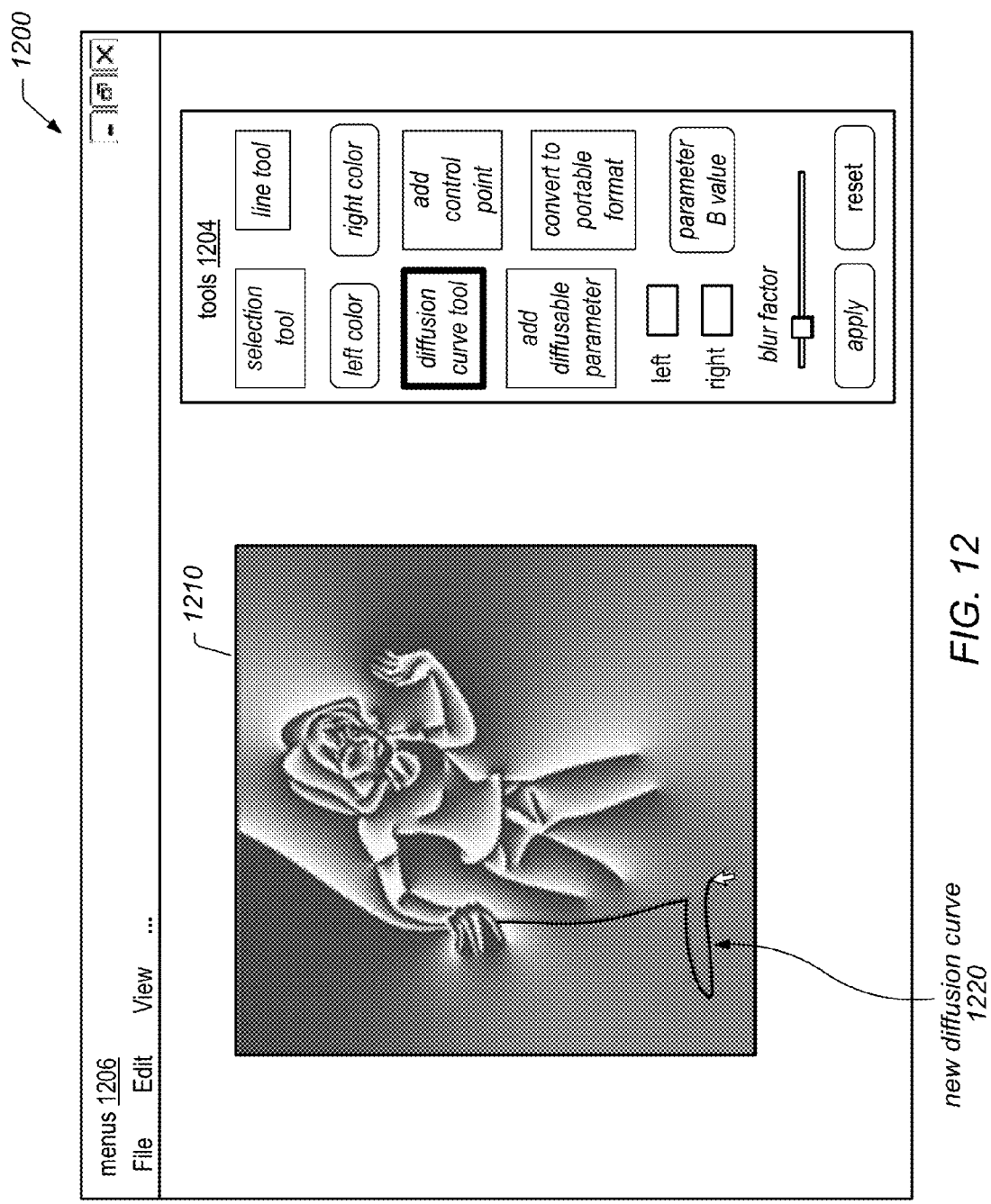
FIG. 12 illustrates a graphical user interface of an image editing application configured to support the creation and conversion of diffusion curve images, according to some embodiments.

As described herein, a graphical user interface of an image editing application may include mechanisms to support the creation of diffusion curve images, and may also provide mechanisms to initiate the conversion of a diffusion curve representation of an image into an alternate representation based on a mesh of shapes. FIG. 12 illustrates an example display 1200 depicting various frames that may be visible to a user during an image editing operation in which a diffusion curve image is being created or modified. In this example, the display is divided into three regions or areas: menus 1206, tools 1204, and active editing window 1210. As illustrated in FIG. 12, tools 1204 may include one or more user-selectable and/or user-modifiable interface elements, such as slider bars, dials, pop-up menus, alphanumeric text entry boxes, check boxes, etc., for specifying various operations to be applied to an image and/or for specifying parameters of those operations. For example, tools area 1204 of the GUI may contain the user interface elements that are selectable to apply various editing operations to an image or to a vector drawing representing an image (e.g., drawing diffusion curves, adding control points on the left and/or right side of the curves, adding diffusible parameters at one or more control points, etc.), as shown in FIG. 12.

In the example illustrated in FIG. 12, the user may be in the process of creating the vector drawing illustrated in active editing window 1210. In this example, the user has chosen a "diffusion curve tool" from tools area 1204, as indicated by the dark border around the user interface element "diffusion curve tool", and is using this tool to add a new diffusion curve 1220 to the vector drawing being edited in active editing window 1210 (e.g., using a mouse, touch pad, keyboard, track ball, etc. to move a cursor across the image to draw new diffusion curve 1220). In other words, in this example, a diffusion curve tool may be used in a manner similar to a line drawing tool (or a freehand drawing tool) to sketch a diffusion curve in the drawing under construction in active editing window 1210. In this example, the input mechanisms illustrated in FIG. 12 may also be used to add control points to new diffusion curve 1220 or any other diffusion curve of the vector drawing illustrated in active editing window 1210. For example, by selecting "add control point" in tools area 1204, the user may be able to identify one or more control points along the curve (e.g., by moving the cursor to each of those points and "clicking" to select them).

In this example, the user may also be able to assign left and right color values to each of the control points in the image (e.g., those on new diffusion curve 1220 or any other diffusion curve already drawn in the image). For example, the user may use the cursor to select one of the control points (either when the control point is initially identified or at a later time) and then may select "left color" or "right color" in tools area 1204 to assign a value to a left or right color attribute for that control point. In some embodiments, selection of the "left color" or "right color" elements of tools area 1204 may cause a pull-down menu of color value options to be displayed for selection or may cause a pop-up window to be displayed from which a color value may be selected. In other embodiments, the "left color" or "right color" elements of tools area 1204 may be alphanumeric text entry boxes or may include slider bars usable for specifying color values at the control point for one or more color channels (not shown). Note that in some embodiments, the system may assign default left and right color values at control points when they are defined for a diffusion curve, and these default values may be overridden by the user by selecting and changing them. Also note that when drawing a diffusion curve image, the user does not need to specify fill colors, as they are defined implicitly by the boundaries formed by the diffusion curves themselves and the values of the color attributes at the control points specified along the diffusion curves.

In various embodiments, other diffusible parameters may be specified using mechanisms in tools area 1204. For example, after identifying a given control point (using the selection tool in tools area 1204, or by another means, in different embodiments), the user may select "add diffusible parameter" in tools area 1204, and may select one of a plurality of available diffusible parameters (e.g., blur, normals, etc.) using a pull-down menu, alphanumeric text entry box or other input mechanism. In the example illustrated in FIG. 12, a "parameter B value" may be specified and attached to a diffusion curve control point. The user may specify whether to add the attribute value to the left or right side of the identified control point by selecting the "left" or "right" elements in tools area 1204. As illustrated in this example, in some embodiments, a blur factor may be specified using a slider bar. In some embodiments, the system may define a default blur value (e.g., 0).

As illustrated in FIG. 12, once a user has constructed a diffusion curve image, the user may initiate the automatic conversion of the diffusion curve representation into a representation that is more suitable for inclusion in a variety of other applications by selecting "convert to portable format" in tools area 1204. In response to this selection, the diffusion curve representation may be converted into a format that may allow the image to be displayed, modified, and/or inserted into a file or document in another application without the need for specialized graphics hardware, as described in detail herein. In some embodiments, the converted data (which may comprise data representing a mesh of shapes and specified diffusible color values for each vertex thereof) may be displayed in active editing window 1210 once it is generated. In such embodiments, the converted data may be rendered for display using a standard interpolation technique for displaying colored polygons, as described herein.

As illustrated in FIG. 12, other operations may be selected using interface mechanisms in tools area 1204, such as a reset function. In various embodiments, the reset tool illustrated in FIG. 12 may or may not be included in the user interface. Another operation that may be selected using a user interface mechanism in tools area 1202 is an "apply" operation, which may be used to commit (e.g., to save or snapshot) one or more editing operations performed during an image editing session. Various embodiments may include other tools not shown as well, such as an "undo" tool that undoes the most recent user action in active editing window 1210.

In the example GUI illustrated in FIG. 12, menus 1206 may include one or more menus, for example menus used to navigate to other displays in the image editing application, open files, print or save files, undo/redo actions, view one or more selected representations of images, and so on. In some embodiments, an image representation (e.g., a file containing image data, data representing one or more diffusion curves, diffusible parameter values, data representing a mesh of shapes, and/or other metadata associated with an image) may be identified by the user through the "file" option in menu area 1206. This menu item may include, for example, a user-selectable pull-down option for importing images or alternate representations thereof from an identified file. In the example GUI illustrated in FIG. 12, active editing window 1210 is the area in which an image or texture being created or modified is displayed as various editing operations are performed. In various embodiments and at various times, active editing window 1210 may display a portion or all of an input image to which an editing operation is to be applied, a vector drawing under construction comprising one or more diffusion curves, a portion or all of preview result image, an output image, an alternate representation of a diffusion curve image, or any intermediate image produced as part of the image editing operations described herein.

In the example GUI illustrated in FIG. 12, menu 2006 includes a "view" option. This menu item may include, for example, a user-selectable pull-down or pop-up menu usable to select which of various representations of an image are displayed in active editing window 1210, or in another area of display 1200. In other embodiments, different input mechanisms may be provided for selecting a view to be displayed, such as one or more radio buttons, alphanumeric text boxes, dials, etc. In some embodiments, one of the available viewing options may be a "split view", in which two or more representations of an image may be simultaneously displayed. In some embodiments, as the user iteratively applies the techniques described herein, the system may be configured to automatically update and/or store the data representing these modified image views. The system may also be configured to automatically refresh the images being displayed in response to these updates.

In some embodiments, a user may be prompted to provide one or more of the inputs described above in response to invoking an operation of the image editing application. In other embodiments, the image editing application may provide default values for any or all of these inputs. In some embodiments, the user may be allowed to override one or more default parameter values using an interface similar to that illustrated in FIG. 12.

Figure 13:
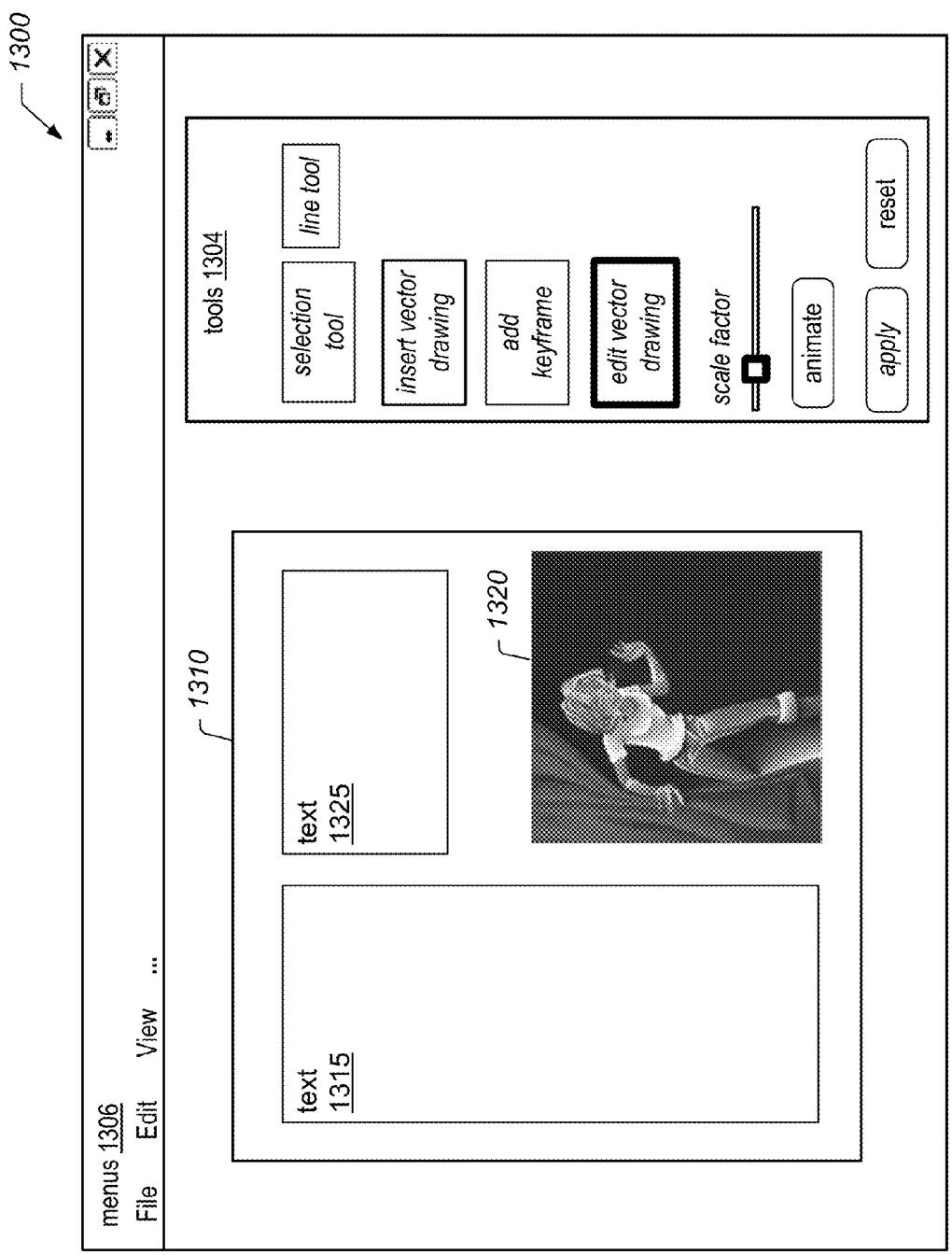
FIG. 13 illustrates a graphical user interface of a document editing application configured to support insertion of vector images converted from diffusion curve images to alternate representations in a scalable, portable format, according to some embodiments.

As previously described, an alternate representation of a diffusion curve image based on a mesh of shapes may be stored in a scalable, portable format usable in a variety of applications. FIG. 13 illustrates an example display 1300 of a graphical user interface of a document editing application. In this example, display 1300 depicts various frames that may be visible to a user during an editing operation in which a diffusion curve image is being added to a document and/or is being modified following insertion into the document. In this example, the display is divided into three regions or areas: menus 1306, tools 1304, and active editing window 1310. As illustrated in FIG. 13, tools 1304 may include one or more user-selectable and/or user-modifiable interface elements, such as slider bars, dials, pop-up menus, alphanumeric text entry boxes, check boxes, etc., for specifying various operations to be applied to a document or elements thereof and/or for specifying parameters of those operations. For example, tools area 1304 of the GUI may contain the user interface elements that are selectable to apply various editing operations to a document or to a vector drawing representing an image within the document, as shown in FIG. 13.

As shown in the example illustrated in FIG. 13, a view of a document under construction (e.g., a page of the document) may be displayed in active editing window 1310. The page being displayed includes two text areas (1315 and 1325) and a vector drawing 1320. Vector drawing 1320 may have been created as a diffusion curve drawing using a graphical user interface of an image editing application, such as that illustrated in FIG. 12 and described above, and may have been converted to a scalable, portable representation for use in the document editing application.

In this example, the user may be in the process of editing vector drawing 1320 (which may be represented by data comprising a mesh of shapes and specified diffusible color values for each vertex thereof). In this example, vector drawing 1320 may have been previously inserted into the document being displayed in active editing window 1310 using the "insert vector drawing" element in tools area 1304. In response to selection of the "insert vector drawing" element, the user may have been prompted to select an image from a file or image repository, e.g., using a pop-up or pull-down menu, or via the "file" or "view" element in menu area 1306 and the data representing the image may have been imported by the document editing application. In some embodiments, the user may have selected a location within the document (or a page thereof) at which to insert the vector drawing (e.g., using the selection tool in tools area 1304, or by another means, in different embodiments). In other embodiments, the user may have first selected a file or image thereof and a location at which to insert the image, and then selected the "insert vector drawing" element to initiate the document editing application importing the data representing the image and placing it at the specified location in the document.

In this example, the user has chosen "edit vector drawing" from tools area 1304, as indicated by the dark border around the user interface element "edit vector drawing", and is using this tool to resize the vector drawing being edited in active editing window 1310 using a slider bar "scale factor". In other embodiments, other user interface elements may be used to resize and/or re-position a vector drawing inserted into a document (e.g., a mouse, touch pad, keyboard, track ball, etc.). Note that because the vector drawing has been converted to a scalable, portable format, if a zoom in operation is selected for the document (or page thereof) being displayed in active editing window 1310 (e.g., using the "View" option in menus 1306), the scaled vector drawing may be easily rendered for display using standard vector graphics techniques, without the use of specialized graphics processing hardware (e.g., a GPU). In some embodiments, the document editing application may be configured to support animation of vector drawings. In such embodiments, additional user interface elements in tools area 1304 may be selected to add one or more keyframes ("add keyframe") and/or to animate the vector drawing ("animate"). In other embodiments, options to animate the image may include procedural animation (i.e. programmatically changing attributes and control point positions) and/or data-driven animation (i.e. mapping attribute values and control point positions to values of an external data-source, such as a motion-capture file, a database, or the like).

Note that other elements of tools area 1304 and menus 1306 (e.g., "File", "View", "apply" and "reset"), may invoke operations similar to those illustrated in FIG. 12 and described above. Note also that, in various embodiments, more, fewer, or different user interface elements may be included in a graphical user interface of a document editing application or another application configured to display diffusion curve images that have been converted to a format comprising a mesh of shapes, as described above. For example, while FIG. 13 depicts a display of a document editing application, other applications that may be configured to display diffusion curve images that have been converted to alternate representations that are scalable and portable, as described herein, may include (but are not limited to) a document viewer, a presentation application, or an animation editing application.

Some embodiments may include a means for creating shapes representing image elements or portions thereof. For example, a shape creation module may present an interface through which shapes may be specified (e.g. by defining one or more diffusion curves) and through which one or more diffusible attributes of those diffusion curves may be specified, may generate data representing one or more shapes dependent on user input, and may store the data representing the one or more shapes for subsequent use, as described herein. The shape creation module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform presenting an interface through which shapes may be specified (e.g. by defining one or more diffusion curves) and through which one or more diffusible attributes of those diffusion curves may be specified, generating data representing one or more shapes dependent on user input, and storing the data representing the one or more shapes for subsequent use, as described herein. Other embodiments of the shape creation module may be at least partially implemented by hardware circuitry and/or firmware stored, for example, in a non-volatile memory.

Some embodiments may include a means for tessellating an image or a portion thereof. For example, a tessellation module may triangulate a portion of an image bounded by diffusion curves to generate an alternate representation of the image area comprising a mesh of shapes formed by the tessellation and may store the alternate representation for subsequent use, as described herein. The tessellation module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform triangulating a portion of an image bounded by diffusion curves to generate an alternate representation of the image area comprising a mesh of shapes formed by the tessellation, and storing the alternate representation for subsequent use, as described herein. Other embodiments of the tessellation module may be at least partially implemented by hardware circuitry and/or firmware stored, for example, in a non-volatile memory.

Some embodiments may include a means for converting a diffusion curve representation of an image into a scalable, portable format. For example, an image format conversion module may invoke a tessellation module to generate an alternate representation of a diffusion curve image, may assign values of one or more diffusible attributes (e.g., color and/or blur) to nodes of the alternate representation dependent on the values of diffusible attributes associated with corresponding control points in the diffusion curve image and/or by interpolating those values, and may store data representing the attribute values in the alternate representation for subsequent use, as described herein. The image format conversion module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform invoking a tessellation module to generate an alternate representation of a diffusion curve image, assigning values of one or more diffusible attributes (e.g., color and/or blur) to nodes of the alternate representation dependent on the values of diffusible attributes associated with corresponding control points in the diffusion curve image and/or by interpolating those values, and storing data representing the attribute values in the alternate representation for subsequent use, as described herein. Other embodiments of the image format conversion module may be at least partially implemented by hardware circuitry and/or firmware stored, for example, in a non-volatile memory.

Figure 14:
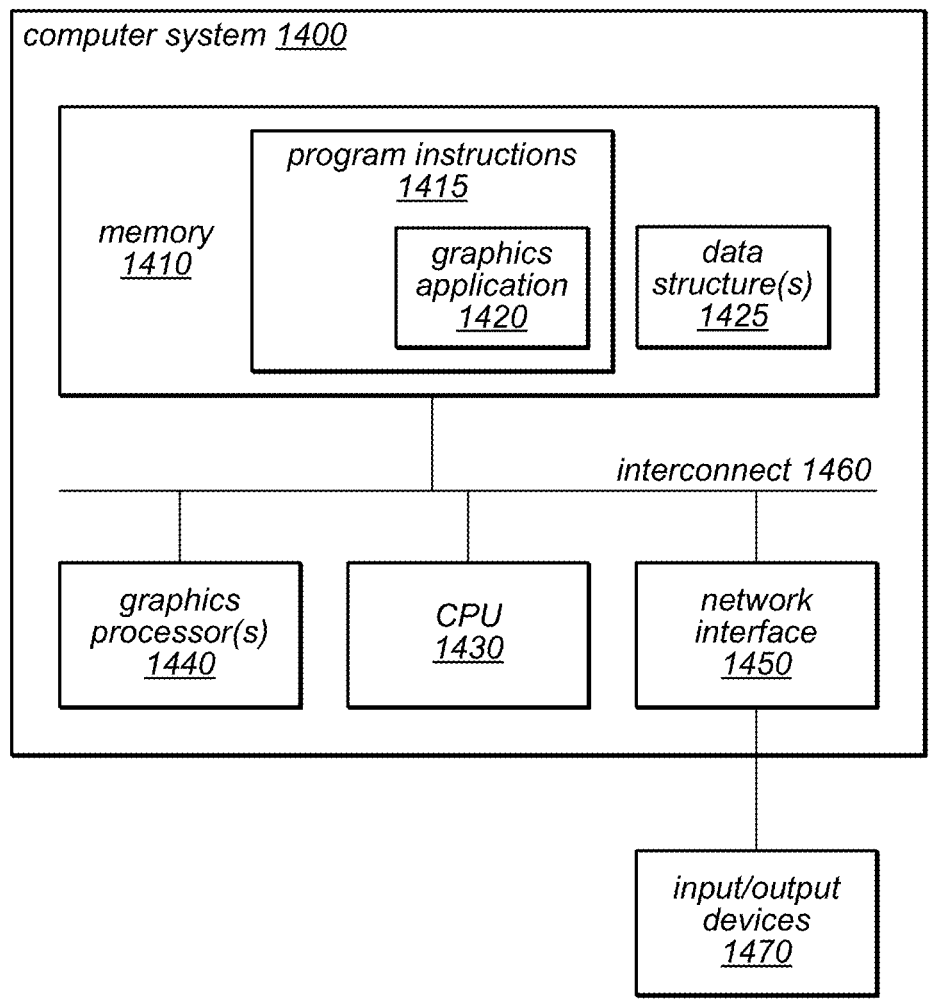
FIG. 14 is a block diagram illustrating one embodiment of a computer system configured to implement creating a diffusion curve and converting it to an alternate representation that is scalable and portable, as described herein.

The methods described herein for creating diffusion curve images and converting them into alternate representations that are scalable and portable may be implemented by a computer system configured to provide the functionality described. FIG. 14 is a block diagram illustrating one embodiment of a computer system 1400 configured to implement such methods. In the illustrated embodiment, computer system 1400 includes one or more processors 1430 coupled to a system memory 1410 via an interconnect 1460. Computer system 1400 further includes a network interface 1450 coupled to interconnect 1460 and to one or more input/output devices 1470, such as cursor control devices, keyboards, displays, or other devices. In some embodiments, it is contemplated that embodiments may be implemented using a single instance of computer system 1400, while in other embodiments multiple such systems, or multiple nodes making up computer system 1400, may be configured to host different portions or instances of embodiments. For example, in one embodiment some elements may be implemented via one or more nodes of computer system 1400 that are distinct from those nodes implementing other elements.

A graphics application such as graphics application 1420 may be configured to perform various image editing functions and to render new images accordingly. In some embodiments a graphics application may include a diffusion curve conversion tool and/or one or more of a shape creation module, a tessellation module or an image format conversion module, such as those described herein. In some embodiments, a user may invoke operations to add, move, or remove objects (including, for example, objects defined by diffusion curves), to resize objects or entire images, to modify a color or blur of an object, or otherwise alter an input image through a user interface of graphics application 1420. Graphics application 1420 may be configured to perform these operations, according to various embodiments, and may employ the methods described herein for creating diffusion curve images and converting them into alternate representations that are scalable and portable. Graphics application 1420 may be configured to render various images (including images stored in a diffusion curve representation or in an alternate representation that is scaleable and portable) to a separate window, or directly into the same frame buffer containing an input image, an image under construction, or a document containing a diffusion curve image that has been converted to a scalable, portable image format, in different embodiments.

Graphics application 1420 may represent various types of graphics applications, such as painting, publishing, photography, games, animation, and other applications. Additionally, graphics application 1420 may utilize a graphics processor (GPU) 1420 when rendering or displaying some images, according to various embodiments. In other embodiments, such as when graphics application 1420 is configured to support vector images in a scalable, portable format, graphics application 1420 may be configured to render images without the use of a GPU. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1440 may implement a number of graphics primitive operations in a way that makes executing them much faster than drawing directly to the screen with a host central processing unit (CPU), such as CPU 1430. However, to invoke the functionality of the GPU, any diffusion curve images to be displayed may need to be stored in a format specific to the particular application programming interface (API) implemented by GPU 1430, rather than in a scalable, portable format. GPUs may be commercially available from vendors such as NVIDIA Corporation, ATI Technologies, and others.

A system for creating diffusion curve images and converting them into alternate representations that are scalable and portable, as described herein, may be implemented on various types of computer systems. Referring again to FIG. 14, computer system 1400 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 1420, which may be configured to implement creating diffusion curve images and converting them into alternate representations that are scalable and portable, as described herein, may be provided as a computer program product, or software, that may include a computer-readable storage medium having stored thereon instructions, which may be used to program a computer system (or other electronic devices) to implement the techniques described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As illustrated in FIG. 14, computer system 1400 may include one or more processor units (CPUs) 1430. Processors 1430 may be implemented using any of a variety of instruction set architectures (ISAs) or chip sets, such as the SPARC™ architecture, an x86-compatible architecture from Intel Corporation or Advanced Micro Devices, a PowerPC™, MIPS™ ISA, or any other suitable ISA or another architecture or chipset capable of processing data, and may in various embodiments include multiple processors, a single threaded processor, a multi-threaded processor, a multi-core processor, or any other type of general-purpose, embedded, or special-purpose processor. Any desired operating system(s) may be run on computer system 1400, such as various versions of Unix, Linux, Windows™ from Microsoft Corporation, MacOS™ from Apple Corporation, or any other operating system that enables the operation of software on a hardware platform. In multiprocessor systems, each of processors 1430 may commonly, but not necessarily, implement the same ISA.

As illustrated in FIG. 14, the computer system 1400 may include one or more system memories 1410 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 1400 via interconnect 1460. Memory 1410 may include other types of memory as well, or combinations thereof. One or more of memories 1410 may include program instructions 1415 executable by one or more of processors 1430 to implement aspects of the techniques described herein. Program instructions 1415, which may include program instructions configured to implement graphics application 1420, may be partly or fully resident within the memory 1410 of computer system 1400 at any point in time. Alternatively, program instructions 1415 may be provided to GPU 1440 for performing operations on GPU 1440. In some embodiments, the techniques described herein may be implemented by a combination of program instructions 1415 executed on one or more processors 1430 and one or more GPUs 1440, respectively. Program instructions 1415 may also be stored on an external storage device (not shown) accessible by the processor(s) 1430 and/or GPU 1440, in some embodiments. Any of a variety of such storage devices may be used to store the program instructions 1415 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 1430 and/or GPU 1440 through one or more storage or I/O interfaces including, but not limited to, interconnect 1460 or network interface 1450, as described herein. In some embodiments, the program instructions 1415 may be provided to the computer system 1400 via any suitable computer-readable storage medium including memory 1410 and/or external storage devices described above. Memory 1410 may also be configured to implement one or more data structures 1425, such as one or more data structures configured to store data representing one or more input images, output images, or intermediate images as a diffusion curve image or in an alternate representation of a diffusion curve image that is scalable and portable. Data structures 1425 may also be configured to implement one or more data structures configured to store metadata associated with those images (e.g., values of diffusible parameters and other attributes, including color and/or blur). Data structures 1425 may be accessible by processor(s) 1430 and/or GPU 1440 when executing graphics application 1420 or other program instructions 1415.

As shown in FIG. 14, processor(s) 1430 may be coupled to one or more of the other illustrated components by at least one communications bus, such as interconnect 1460 (e.g., a system bus, LDT, PCI, ISA, or other communication bus type), and a network interface 1450 (e.g., an ATM interface, an Ethernet interface, a Frame Relay interface, or other interface). The CPU 1430, the network interface 1450, and the memory 1410 may be coupled to the interconnect 1460. It should also be noted that one or more components of system 1400 may be located remotely and accessed via a network.

As noted above, in some embodiments, memory 1410 may include program instructions 1415, comprising program instructions configured to implement graphics application 1420, as described herein. Graphics application 1420 may be implemented in various embodiments using any desired programming language, scripting language, or combination of programming languages and/or scripting languages, e.g., C, C++, C#, Java™, Perl, etc. For example, in one embodiment, graphics application 1420 may be JAVA based, while in another embodiment, it may be implemented using the C or C++ programming languages. In still other embodiments, graphics application 1420 (or portions thereof) may be implemented using specific graphic languages specifically for developing programs executed by specialize graphics hardware, such as GPU 1440. In addition, graphics application 1420 may be embodied on memory specifically allocated for use by graphics processor(s) 1440, such as memory on a graphics board including graphics processor(s) 1440. Thus, memory 1410 may represent may represent any of various types and arrangements of memory, including general-purpose system RAM and/or dedication graphics or video memory, in various embodiments. Memory 1410 may in some embodiments also include a data store configured to store image data for one or more input images and/or output images, in various embodiments. Other information not described herein may be included in memory 1410 and may be used to implement the methods described herein and/or other functionality of computer system 1400.

Network interface 1450 may be configured to enable computer system 1400 to communicate with other computers, systems or machines, such as across a network. Network interface 1450 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 1400 is interconnected may include multi-protocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 1450 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

Computer system 1400 may also include one or more additional I/O interfaces, such as interfaces for one or more user input devices 1470, or such devices may be coupled to computer system 1400 via network interface 1450. For example, computer system 1400 may include interfaces to a keyboard, a mouse or other cursor control device, a joystick, or other user input devices 1470, in various embodiments. Additionally, the computer system 1400 may include one or more displays (not shown), coupled to processors 1430 and/or other components via interconnect 1460 or network interface 1450. Such input/output devices may be configured to allow a user to interact with graphics application 1420 to request or invoke various image editing operations and/or to specify various parameters, thresholds, and/or other configurable options available to the user when creating, converting, inserting, and/or modifying vector images while executing graphic application 1420. It will be apparent to those having ordinary skill in the art that computer system 1400 may also include numerous other elements not shown in FIG. 14.

Note that program instructions 1415 may be configured to implement a graphic application 1420 as a stand-alone application, or as a module of another graphics application or graphics library, in various embodiments. For example, in one embodiment program instructions 1415 may be configured to implement graphics applications such as painting, publishing, photography, games, animation, and/or other applications, and may be configured to edit images as part of one or more of these graphics applications. In another embodiment, program instructions 1415 may be configured to implement the techniques described herein in one or more functions called by another graphics application executed on GPU 1440 and/or processor(s) 1430. Program instructions 1415 may also be configured to render images and present them on one or more displays as the output of an image or document editing operation and/or to store image data for modified and/or reconstructed images in memory 1410 and/or an external storage device(s), in various embodiments. For example, a graphics application 1420 included in program instructions 1415 may utilize GPU 1440 when modifying, rendering, or displaying some images in some embodiments.

While various techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in example configurations may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A system, comprising:
   one or more processors; and
   a memory coupled to the one or more processors and storing program instructions executable by the one or more processors to perform:
   accessing an input image bounded by a closed two-dimensional boundary, the input image comprising vector graphics and one or more diffusion curves, each diffusion curve comprising one or more color constraint values for points along the diffusion curve;
   tessellating the input image based, at least in part, on one or more areas defined by boundaries of the one or more diffusion curves;
   responsive to the tessellating, generating an alternate data representation of the input image comprising a mesh of tessellation elements;
   assigning one or more color constraint values to each vertex of the mesh of tessellation elements in the alternate data representation based, at least in part, on the one or more color constraint values of the one or more diffusion curves;
   storing the alternate data representation; and
   rendering, independent of a graphical processing unit, an output image from the stored alternate data representation, the rendering including interpolating the assigned one or more color constraint values to determine color values for image locations interior to each of the tessellation elements, thereby producing a diffused color effect across the output image.

2. The system of claim 1, wherein the closed two-dimensional boundary comprises at least one diffusion curve for which one or more color constraint values are specified at one or more color control points along the curve.

3. The system of claim 2, wherein said assigning comprises assigning a color constraint value to a vertex of the mesh corresponding to one of the color control points along the curve dependent on the one or more color constraint values specified at the one of the one or more color control points.

4. The system of claim 2, wherein said tessellating comprises generating a piecewise linear approximation of the at least one diffusion curve.

5. The system of claim 1, wherein said storing comprises storing the alternate data representation, including the assigned color constraint values, in a format supported by a portable document format standard.

6. The system of claim 1, wherein said tessellating comprises generating a respective data representation of the input image comprising a mesh of tessellation elements for each of a plurality of color channels.

7. The system of claim 1, wherein said tessellating comprises triangulating the input image, and wherein the mesh of tessellation elements comprises a mesh of triangles.

8. The system of claim 7, wherein said assigning comprises solving a sparse linear system in the triangle domain.

9. The system of claim 1, wherein the one or more processors comprises a general-purpose processor, and wherein said rendering is implemented by program instructions executable by the general-purpose processor.

10. The system of claim 1, wherein the program instructions are further executable by the one or more processors to implement assigning a blur value to at least one vertex of the mesh of tessellation elements, and wherein said rendering further comprises interpolating the blur value to control smoothness of the diffused color effect in the output image.

11. The system of claim 1, wherein said tessellating comprises generating one or more ghost vertices to complete one-ring neighborhoods of vertices on the boundary of the tessellated image.

12. A method, comprising:
   performing, by a computer:
   accessing an input image bounded by a closed two-dimensional boundary, the input image comprising vector graphics and one or more diffusion curves, each diffusion curve comprising one or more color constraint values for points along the diffusion curve;
   tessellating the input image based, at least in part, on an area defined by boundaries of the one or more diffusion curves;
   responsive to the tessellating, generating an alternate data representation of the input image comprising a mesh of tessellation elements;
   assigning one or more color constraint values to each vertex of the mesh of tessellation elements in the alternate data representation based, at least in part, on the one or more color constraint values of at least one diffusion curve;
   storing the alternate data representation; and rendering, without using a graphical processing unit, an output image based on the stored alternate data representation, the rendering including interpolating the assigned one or more color constraint values to determine a color value for an image location interior to one of the tessellation elements.

13. The method of claim 12,
wherein the closed two-dimensional boundary comprises at least one diffusion curve for which one or more color constraint values are specified at one or more color control points along the curve; and
wherein said assigning comprises assigning a color constraint value to a vertex of the mesh corresponding to one of the color control points along the curve dependent on the one or more color constraint values specified at the one of the one or more color control points.

14. The method of claim 12, wherein said storing comprises storing the alternate data representation, including the assigned color constraint values, in a format supported by a portable document format standard.

15. The method of claim 12, wherein said tessellating comprises generating a respective data representation of the input image comprising a mesh of tessellation elements for each of a plurality of color channels.

16. The method of claim 12, wherein said tessellating comprises triangulating the input image, and wherein the mesh of tessellation elements comprises a mesh of triangles.

17. An apparatus comprising:
a display device; and
one or more modules configured to:
 access an input image bounded by a closed two-dimensional boundary, the input image comprising vector graphics and one or more diffusion curves, each diffusion curve comprising one or more color constraint values for each point along the diffusion curve;
 tessellate the input image based, at least in part, on an area defined by boundaries of the one or more diffusion curves;
 responsive to the input image being tessellated, generate an alternate data representation of the input image comprising a mesh of tessellation elements;
 assign one or more color constraint values to each node of the mesh of tessellation elements in the alternate data representation based, at least in part, on the one or more color constraint values of the one or more diffusion curves;
 store the alternate data representation; and
 render, on the display device and without requiring use of a specialized graphics hardware, an output image based on the stored alternate data representation, the output image being rendered based, at least in part, on an interpolation of the assigned color constraint values.

18. The apparatus of claim 17,
wherein the closed two-dimensional boundary comprises at least one diffusion curve for which one or more color constraint values are specified at one or more color control points along the curve; and
wherein a color constraint value assigned to a particular node of the mesh corresponds to one of the color control points along the curve and is dependent on the one or more color constraint values specified at the corresponding color control point.

19. The apparatus of claim 17, wherein the one or more modules are further configured to generate a respective data representation of the input image comprising a mesh of tessellation elements for each of a plurality of color channels.

20. The apparatus of claim 17, wherein the mesh of tessellation elements comprises a mesh of triangles, and wherein the assigned one or more color constraint values are based, at least in part, on solving a sparse linear system in the triangle domain.

* * * * *